United States Patent
Cerezo-Galvez et al.

(10) Patent No.: US 11,647,750 B2
(45) Date of Patent: May 16, 2023

(54) ACTIVE COMPOUND COMBINATIONS HAVING INSECTICIDAL/ACARICIDAL PROPERTIES

(71) Applicant: Bayer Aktiengesellschaft, Leverkusen (DE)

(72) Inventors: Silvia Cerezo-Galvez, Langenfeld (DE); Christian Marienhagen, Langenfeld (DE); Holger Weckwert, Leichlingen (DE); Wolfgang Thielert, Odenthal (DE); Marita John, Bottrop (DE)

(73) Assignee: Bayer Aktiengesellschaft, Leverkusen (DE)

( * ) Notice: Subject to any disclaimer, the term of this patent is extended or adjusted under 35 U.S.C. 154(b) by 236 days.

(21) Appl. No.: 16/756,694

(22) PCT Filed: Oct. 12, 2018

(86) PCT No.: PCT/EP2018/077873
§ 371 (c)(1),
(2) Date: Apr. 16, 2020

(87) PCT Pub. No.: WO2019/076752
PCT Pub. Date: Apr. 25, 2019

(65) Prior Publication Data
US 2020/0236942 A1 Jul. 30, 2020

(30) Foreign Application Priority Data
Oct. 18, 2017 (EP) .................................. 17197094

(51) Int. Cl.
*A01N 43/90* (2006.01)
*A01N 43/78* (2006.01)

(52) U.S. Cl.
CPC ............. *A01N 43/90* (2013.01); *A01N 43/78* (2013.01)

(58) Field of Classification Search
CPC ................................ A01N 43/80; A01N 43/78
See application file for complete search history.

(56) References Cited

U.S. PATENT DOCUMENTS

| | | | | |
|---|---|---|---|---|
| 9,642,363 B2* | 5/2017 | Koehler | ............... | C07D 211/72 |
| 11,058,114 B2* | 7/2021 | Alig | .................. | A01N 37/52 |
| 11,191,271 B2* | 12/2021 | Cerezo-Galvez | ...... | A01N 41/10 |
| 2008/0305955 A1 | 12/2008 | Bretschneider et al. | | |
| 2011/0015405 A1* | 1/2011 | Antons | ................ | C07D 249/08 |
| | | | | 548/269.4 |
| 2011/0190493 A1 | 8/2011 | Bretschneider et al. | | |
| 2011/0306499 A1 | 12/2011 | Bretschneider et al. | | |
| 2014/0315898 A1* | 10/2014 | Koehler | ............... | C07D 295/13 |
| | | | | 549/75 |
| 2015/0189882 A1 | 7/2015 | Hungenberg et al. | | |
| 2017/0057914 A1 | 3/2017 | Koehler et al. | | |

FOREIGN PATENT DOCUMENTS

| | | |
|---|---|---|
| EP | 2090170 A1 | 8/2009 |
| EP | 2604118 A1 | 6/2013 |
| WO | 2004095930 A1 | 11/2004 |
| WO | 2006089633 A2 | 8/2006 |
| WO | 2008067911 A1 | 6/2008 |
| WO | 2013092350 A1 | 6/2013 |

OTHER PUBLICATIONS

International Search Report for PCT/EP2018/077873 dated Nov. 20, 2018.
Clive Tomlin, "The Pesticide Manual", The British Crop Protection Council and the Royal Soc. of Chemistry, (2012) 16th edition, ISBN: 1901396118 9781901396119.

* cited by examiner

*Primary Examiner* — Amanda L. Aguirre
(74) *Attorney, Agent, or Firm* — McBee Moore & Vanik IP, LLC

(57) ABSTRACT

The present invention relates to novel active compound combinations comprising at least one known compound of the formula (I)

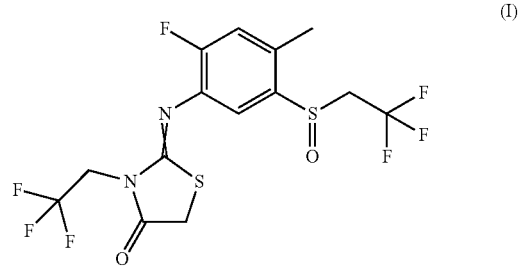

and at least one further active compound, which combinations are highly suitable for controlling animal and microbial pests such as unwanted insects and/or unwanted acarida and/or unwanted nematodes.

14 Claims, No Drawings

ACTIVE COMPOUND COMBINATIONS HAVING INSECTICIDAL/ACARICIDAL PROPERTIES

CROSS-REFERENCE TO RELATED APPLICATIONS

This application is the National Stage entry of International Application No. PCT/EP2018/077873, filed 12 Oct. 2018, which claims priority to European Patent Application No. 17197094.0, filed 18 Oct. 2017.

BACKGROUND

Field

The present invention relates to active compound combinations comprising firstly at least one compound of formula (I) as shown below and secondly and at least one active compound of group (II) selected from (a) Insecticide Groups (IRAC (Insecticide Resistance Action Committee) mode of action classification groups; also designated as "IRAC classification groups") (5), (6), (9), (15), (23), (25) and (29), and (b) compounds of formula (IIa) or (IIb) or (IIc) or (IIc') as shown below. Such combinations are highly suitable for controlling animal and microbial pests, such as unwanted insects, especially acarids (mites), nematodes and as plant strengthening agents.

Description of Related Art

The compound of formula (I) and methods for its production are known from WO 2013/092350 and its insecticidal action has been described.

However, the acaricidal and/or insecticidal efficacy and/or the activity spectrum and/or the compatibility of the known compounds with plants, especially with respect to crop plants, is not always satisfactory. Therefore, novel active compound combinations with improved properties are in great demand.

SUMMARY

It has now been found that an active compound combination comprising at least one compound of the formula (I)

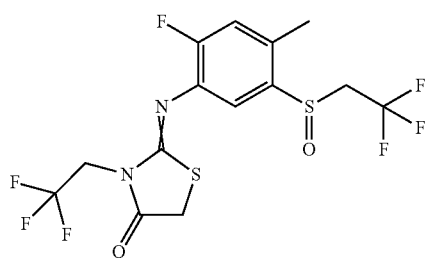

(I)

and at least one active compound of group (II) which is selected from
(a) Insecticide Groups (IRAC classification groups) (5), (6), (9), (15), (23), (25) and (29), or
(b) compounds of formula (IIa) or (IIb) or (IIc) or (IIc'), is highly suitable for the control of animal and microbial pests as well as plant strengthening agent. Especially, such active compound combinations have very good insecticidal, acaricidal and nematicidal properties.

DETAILED DESCRIPTION OF A PREFERRED EMBODIMENT

In formula (I), the crossed double bond indicates that E- or Z-isomers of the compound are possible, i.e. the 5-membered ring might be present in two different orientations. According to the invention, the compound of formula (I) can be present in form of its E-isomer or in form of its Z-isomer or in form of a mixture of both E- and Z-isomers.

Such active compound combinations are very suitable for controlling animal and microbial pests such as insects and/or arachnids, especially acarids, and/or nematodes and/or fungi, and indirectly improve plant health. Further, such active compound combinations can be used for reducing overall damage of plants and plant parts as well as losses in harvested fruits or vegetables caused by such pests, e.g. insects, mites and phytopathogens. Further, such active compound combinations are suitable as plant strengthening agents.

Surprisingly, the insecticidal effect and/or arachnicidal/acaricidal effect and/or nematicidal effect and/or antimicrobial effect and/or the fungicidal effect and/or the plant-strengthening effect and/or the yield-increasing effect of the active compound combinations according to the invention is substantially higher than the sum of the effects of the individual active ingredients. There is an unpredictable real synergistic effect and not just a complementary/additive effect.

The active compound combinations according to the invention preferably comprise the compound of formula (I) and the compound of group (II) in synergistically effective amounts. Group II consists of
(a) Insecticide Groups (IRAC (Insecticide Resistance Action Committee) mode of action classification groups; also designated as "IRAC classification groups") (5), (6), (9), (15), (23), (25) and (29), and
(b) compounds of formula (IIa) or (IIb) or (IIc) or (IIc') as shown below.

Therefore, the at least one active compound of group (II) is selected from (a) or (b). These groups (a) and (b) are further defined as follows:
(a) Insecticide Groups (IRAC classification groups):
(5) Nicotinic acetylcholine receptor (nAChR) allosteric modulators, such as, for example, spinosyns, e.g. spinetoram and spinosad, wherein said mentioned compounds are preferred.
(6) Glutamate-gated chloride channel (GluCl) allosteric modulators, such as, for example, avermectins/milbemycins, for example abamectin, emamectin benzoate, lepimectin and milbemectin, wherein said mentioned compounds are preferred.
(9) Chordotonal organ TRPV channel modulators, such as, for example pymetrozine or pyrifluquinazone, wherein said mentioned compounds are preferred.
(15) Inhibitors of chitin biosynthesis, type 0, such as, for example, bistrifluron, chlorfluazuron, diflubenzuron, flucycloxuron, flufenoxuron, hexaflumuron, lufenuron, novaluron, noviflumuron, teflubenzuron and triflumuron, wherein said mentioned compounds are preferred.
(23) Inhibitors of acetyl CoA carboxylase, such as, for example, tetronic and tetramic acid derivatives, e.g. spirodiclofen, spiromesifen and spirotetramat, wherein said mentioned compounds are preferred.

(25) Mitochondrial complex II electron transport inhibitors, such as, for example, beta-ketonitrile derivatives, e.g. cyenopyrafen and cyflumetofen and carboxanilides, such as, for example, pyflubumide, wherein said mentioned compounds are preferred.

(29) Chordotonal organ Modulators (with undefined target site) such as, for example, flonicamid, wherein said mentioned compounds are preferred.

(b) Compounds of formula (IIa) or (IIb) or (IIc) or (IIc'):
Compound of formula (IIa):

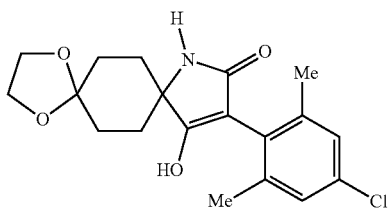 [SMILES: Cc1cc(Cl)cc(C)c1C1=C(O)C2(CCC3(CC2)OCCO3)NC1=O]

(IIa), known from WO 2006/089633 A1.
Compound of formula (IIb):

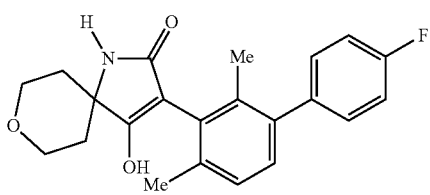 [SMILES: Cc1ccc(-c2ccc(F)cc2)c(C)c1C1=C(O)C2(CCOCC2)NC1=O]

(IIb), known from WO 2008/067911 A1.
Compound of formula (IIc):

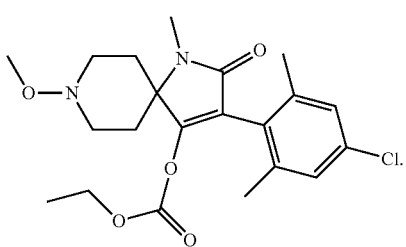

(IIc)

Compound of formula (IIc'):

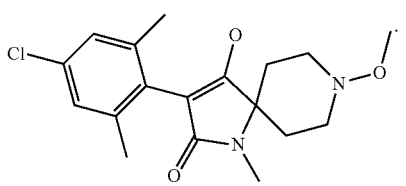

(IIc')

The compound of formula (IIc') shall be understood to be the free enol of the compound of formula (IIc).

All mixing partners of group II can, if their functional groups enable this, optionally form salts with suitable bases or acids. All mixing partners of group II can include tautomeric forms, where applicable.

The active compounds of group II which are specified herein by their "common name" are known and described inter alia in "The Pesticide Manual", 16th edition, The British Crop Protection Council and the Royal Soc. of Chemistry, 2012 and the literature cited therein or can be searched in the internet (e.g. http://www.alanwood.net/pesticides). Particularly, reference shall be made to said Manual or website in order to further specify such a mixing partner of group II, e.g. to provide its chemical structure, IUPAC name or its pesticidal activity. Further information about such a mixing partner of group II will be provided as well, in particular it's composition in case that the mixing partner of group II is itself a mixture, e.g. a mixture of enantiomers.

For example, from the data sheet for compound (II-10) "Spinosad" (http://www.alanwood.net/pesticides/spinosad.html) it becomes evident that "Spinosad" is a mixture of 50-95% (2R,3aS,5aR,5bS,9S,13S,14R,16aS,16bR)-2-(6-deoxy-2,3,4-tri-O-methyl-α-L-mannopyranosyloxy)-13-(4-dimethylamino-2,3,4,6-tetradeoxy-β-D-erythropyranosyloxy)-9-ethyl-2,3,3a,5a,5b,6,7,9,10,11,12,13,14,15,16a,16b-hexadecahydro-14-methyl-1H-as-indaceno[3,2-d]oxacyclododecine-7,15-dione and 50-5% (2S,3aR,5aS,5bS,9S,13S,14R,16aS,16bS)-2-(6-deoxy-2,3,4-tri-O-methyl-α-L-mannopyranosyloxy)-13-(4-dimethylamino-2,3,4,6-tetradeoxy-β-D-erythropyranosyloxy)-9-ethyl-2,3,3a,5a,5b,6,7,9,10,11,12,13,14,15,16a,16b-hexadecahydro-4,14-dimethyl-1H-as-indaceno[3,2-d]oxacyclododecine-7,15-dione (IUPAC), has the CAS Registration No. 168316-95-8 (131929-60-7+131929-63-0) and possesses insecticidal activity.

If, e.g. within this description, the common name of an active compound is used, this in each case encompasses all common derivatives, such as the esters and salts, and isomers, especially optical isomers, especially the commercial form or forms. If an ester or salt is referred to by the common name, this also refers in each case to all other common derivatives, such as other esters and salts, the free acids and neutral compounds, and isomers, especially optical isomers, especially the commercial form or forms. The chemical compound names mentioned refer to at least one of the compounds encompassed by the common name, frequently a preferred compound.

Methods and Uses

The invention also relates to methods for controlling animal or microbial pests, in which active compound combinations according to the invention are allowed to act on the animal or microbial pests and/or their habitat. Preferably, the animal pest is an insect or arachnid or acarid pest. Such control of the animal or microbial pests is preferably conducted in agriculture and forestry, and in material protection. Preferably excluded herefrom are methods for the surgical or therapeutic treatment of the human or animal body and diagnostic methods carried out on the human or animal body.

The invention also relates to the use of active compound combinations according to the invention as pesticidal combinations, in particular crop protection agents. In the context of the present application, the term "pesticide" in each case also always comprises the term "crop protection agent".

The active compound combinations according to the invention are preferably suitable for controlling animal and microbial pests.

The active compound combinations according to the invention are particularly preferably suitable for controlling animal pests, especially insect or arachnid or acarid pests.

The active compound combinations according to the invention are particularly preferably suitable for controlling microbial pests.

The active compound combinations according to the invention are particularly preferably suitable for controlling nematodes.

Preferably excluded from such uses are uses for the surgical or therapeutic treatment of the human or animal body and diagnostic methods carried out on the human or animal body.

The active compound combinations according to the invention are particularly preferably used as plant-strengthening agents.

If appropriate, the active compound combinations according to the invention can, at certain concentrations or application rates, also be used as herbicides, safeners, growth regulators or agents to improve plant properties, or as microbicides, for example as fungicides, antimycotics, bactericides, viricides (including agents against viroids) or as agents against MLO (Mycoplasma-like organisms) and RLO (Rickettsia-like organisms). If appropriate, they can also be employed as intermediates or precursors for the synthesis of other active compound compositions.

The invention also relates to a process for preparing a crop protection agent, characterized in that an active compound combination according to the invention is mixed with extenders and/or surfactants.

The invention also relates to the use of an active compound combination according to the invention for treating plants or parts thereof selected from the group consisting of citrus, pome fruits, stone fruits, tropical fruits, nuts, berries, vegetables, cotton, soybean, grape, tea, coffee, maize, rice and ornamentals.

The person skilled in the art is aware that the terms "a" or "an", as used in the present application, may, depending on the situation, mean "one (1)" "one (1) or more" or "at least one (1)". Generally, the term refers to the meaning of "one (1) or more" or "at least one (1)". However, in one embodiment, the term "a" refers exclusively to "one (1)".

In the context of the present invention, "control of pests" means a reduction in infestation by harmful pests, compared with the untreated plant measured as pesticidal efficacy, preferably a reduction by 25-50%, compared with the untreated plant (100%), more preferably a reduction by 40-79%, compared with the untreated plant (100%); even more preferably, the infection by pests is entirely suppressed (by 70-100%). The control may be curative, i.e. for treatment of already infected plants, or protective, for protection of plants which have not yet been infected.

In the context of the present invention, "control of microbial pests" means a reduction in infestation by harmful microorganisms, compared with the untreated plant measured as fungicidal efficacy, preferably a reduction by 25-50%, compared with the untreated plant (100%), more preferably a reduction by 40-79%, compared with the untreated plant (100%); even more preferably, the infection by harmful microorganisms is entirely suppressed (by 70-100%). The control may be curative, i.e. for treatment of already infected plants, or protective, for protection of plants which have not yet been infected.

Mites are arthropods belonging to the subclass Acari (also known as *Acarina*) of the class Arachnida. Bananas and plantains belong to the genera *Musa* in the family Musaceae.

*Citrus* is a common term and genus (*Citrus*) of flowering plants in the rue family, Rutaceae. The term *Citrus* includes orange (*C. sinensis*), lemon (*C. limon*), grapefruit (*C. paradisi*), and lime (various, mostly *C. aurantifolia*, the key lime).

Pome is a common term for fruits produced by flowering plants in the subtribe Malinae of the family Rosaceae and for plants producing these fruits. A pome is an accessory fruit composed of one or more carpels surrounded by accessory tissue. Examples of plants that produce fruit classified as a pome are apple, loquat, pear, Pyracantha, and quince.

Vegetable as used herein refers to an edible plant or its part selected from the list consisting of flower bud vegetable such as broccoli, cauliflower, globe artichokes and capers; leaf vegetable such as kale, spinach (*Spinacia oleracea*), arugula (*Eruca sativa*), and lettuce (*Lactuca sativa*); stem vegetable such as kohlrabi; stem shoot vegetable such as asparagus, bamboo shoots, potatoes (*Solanum tuberosum* L) and sweet potatoes (*Ipomoea batatas*); root vegetable such as carrots (*Daucus carota*), parsnips (*Pastinaca sativa*), beets (*Beta vulgaris*), and radishes (*Raphanus sativus*); bulb vegetable such as onion, garlic and shallots of genus *Allium*; tomato (*Solanum lycopersicum*), cucumber (*Cucumis sativus*), zucchini, squash and pumpkin of genus species *Cucurbita pepo*, pepper (of family Solanaceae), eggplant; beans (*Phaseolus vulgaris*). and pea (*Pisum sativum*).

Stone fruit are all species of the *Prunus* genus. Examples of plants that produce fruit classified as a stone fruit are e.g. peaches, nectarines, plums, apricots, and cherries. Subtropical and tropical fruit are fruit produced by plants native to the geographical and climatic region of the subtropics or tropics. Examples of plants that produce fruit classified as a subtropical or tropical fruit are e.g avocado, banana, cherimoya, date, dragon fruit, durian, fig, guava, jackfruit, kiwi, lychee, mango, mangosteen, passion fruit, papaya, pineapple, persimmon, pomegranate, rambutan and star fruit. Nuts are referring to any hard-walled, edible kernel such as e.g. almonds, Brazil nuts, cashews, hazelnuts, macadamias, peanuts, pecans, pine nuts, pistachios and walnuts.

Berries are any small edible fruit usually juicy, round, brightly coloured, sweet or sour, and do not have a stone or pit, although seeds may be present as e.g. blackberry, blueberry, cranberry, currant, elderberry, gooseberry, grape, raspberry, strawberry.

Ornamentals are plants grown for decorative purposes in gardens and landscape design, as houseplants, for cut flowers and specimen display, e.g. roses, chrysanthemums, tulips, etc.

An individual embodiment refers to an active compound combination according to the invention, wherein the compound of group (II) is selected from the group consisting of (a) Insecticide Groups (5), (6), (9), (15), (23), (25) and (29).

Another individual embodiment refers to an active compound combination according to the invention, wherein the compound of group (II) is selected from the group consisting of (b) compounds of formula (IIa) or (IIb) or (IIc) or (IIc').

The compound of the formula (I) has a chiral sulphoxide group so that it forms two enantiomers having (+) or (−) specific rotation:

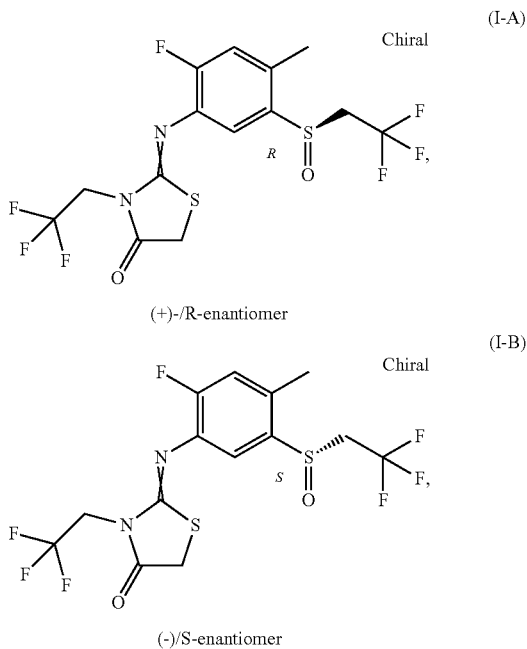

(+)-/R-enantiomer (−)-/S-enantiomer

For the two enantiomers of the compound of formula (I) it is to be understood that the (+) enantiomer is the (R)-enantiomer and the (S)-enantiomer is the (−) enantiomer, i.e. the compound of formula (I-A) is also to be designated as (R)-enantiomer and the compound of formula (I-B) is also to be designated as (S)-enantiomer.

In the synthesis from achiral starting materials the two enantiomers are formed in equal amounts so that a racemate is present. The separation of the racemate into the individual enantiomers is known from the literature (cf. WO 2013/092350).

Accordingly, the present invention provides active compound combinations comprising the racemate or the (+) or (−) enantiomer of the compound of formula (I) and at least one active compound of group (II). Preferably, the optically active, stereoisomeric forms of the compound of formula (I) and its salts are used according to the invention, especially preferably its (+) enantiomer.

An individual embodiment refers to active compound combinations comprising the racemate or the (+) or (−) enantiomer of the E-isomer of the compound of formula (I) and at least one active compound of group (II). Preferably, the optically active, stereoisomeric forms of the compound of formula (I) and its salts are used according to the invention, especially preferably its (+) enantiomer.

Another individual embodiment refers to active compound combinations comprising the racemate or the (+) or (−) enantiomer of the Z-isomer of the compound of formula (I) and at least one active compound of group (II). Preferably, the optically active, stereoisomeric forms of the compound of formula (I) and its salts are used according to the invention, especially preferably its (+) enantiomer.

Another individual embodiment refers to an active compound combination according to the invention, wherein the compound of formula (I) is present in form of its racemate.

Another individual embodiment refers to an active compound combination according to the invention, wherein the E-isomer of the compound of formula (I) is present in form of its racemate.

Another individual embodiment refers to an active compound combination according to the invention, wherein the Z-isomer of the compound of formula (I) is present in form of its racemate.

Another individual embodiment refers to an active compound combination according to the invention, wherein the compound of formula (I) is present in form of its (+) enantiomer, or is present in form of a mixture of its (+) enantiomer and its (−) enantiomer which is enriched in the (+) enantiomer, preferably in a mixing ratio of at least 60:40 and increasingly preferably of at least 70:30, 75:25, 80:20, 85:15 und 90:10 (+):(−) enantiomer.

Another individual embodiment refers to an active compound combination according to the invention, wherein the E-isomer of the compound of formula (I) is present in form of its (+) enantiomer, or is present in form of a mixture of its (+) enantiomer and its (−) enantiomer which is enriched in the (+) enantiomer, preferably in a mixing ratio of at least 60:40 and increasingly preferably of at least 70:30, 75:25, 80:20, 85:15 und 90:10 (+):(−) enantiomer.

Another individual embodiment refers to an active compound combination according to the invention, wherein the Z-isomer of the compound of formula (I) is present in form of its (+) enantiomer, or is present in form of a mixture of its (+) enantiomer and its (−) enantiomer which is enriched in the (+) enantiomer, preferably in a mixing ratio of at least 60:40 and increasingly preferably of at least 70:30, 75:25, 80:20, 85:15 und 90:10 (+):(−) enantiomer.

Reference is also made to an active compound combination, wherein the compound of formula (I) is present in form of its (−) enantiomer, or is present in form of a mixture of its (−) enantiomer and its (+) enantiomer which is enriched in the (−) enantiomer, preferably in a mixing ratio of at least 60:40 and increasingly preferably of at least 70:30, 75:25, 80:20, 85:15 und 90:10 (−):(+) enantiomer.

Reference is also made to an active compound combination, wherein the E-isomer of the compound of formula (I) is present in form of its (−) enantiomer, or is present in form of a mixture of its (−) enantiomer and its (+) enantiomer which is enriched in the (−) enantiomer, preferably in a mixing ratio of at least 70:30, 75:25, 80:20, 85:15 und 90:10 (−):(+) enantiomer.

Reference is also made to an active compound combination, wherein the Z-isomer of the compound of formula (I) is present in form of its (−) enantiomer, or is present in form of a mixture of its (−) enantiomer and its (+) enantiomer which is enriched in the (−) enantiomer, preferably in a mixing ratio of at least 60:40 and increasingly preferably of at least 70:30, 75:25, 80:20, 85:15 und 90:10 (−):(+) enantiomer.

In the following, more preferred compounds of group (II) are described:

(a) More preferred mixing partners from the Insecticide Groups (IRAC classification groups) (5), (6), (9), (15), (23), (25) and (29) are:

(II-1) abamectin (IUPAC-name: extended von Bayer nomenclature: mixture of ≥80% (10E,14E,16E)-(1R,4S,5'S,6S,6'R,8R,12S,13S,20R,21R,24S)-6'-[(S)-sec-butyl]-21,24-dihydroxy-5',11,13,22-tetramethyl-2-oxo-(3,7,19-trioxatetracyclo[15.6.1.1$^{4,8}$.0$^{20,24}$]pentacosa-10,14,16,22-tetraene)-6-spiro-2'-(5',6'-dihydro-2'H-pyran)-12-yl 2,6-dideoxy-4-O-(2,6-dideoxy-3-O-methyl-α-L-arabino-hexopyranosyl)-3-

O-methyl-α-L-arabino-hexopyranoside and ≤20% (10E,14E,16E)-(1R,4S,5'S,6S,6'R,8R,12S,13S,20R,21R,24S)-21,24-dihydroxy-6'-isopropyl-5',11,13,22-tetramethyl-2-oxo-(3,7,19-trioxatetracyclo[15.6.1.1$^{4,8}$.0$^{20,24}$]pentacosa-10,14,16,22-tetraene)-6-spiro-2'-(5',6'-dihydro-2'H-pyran)-12-yl 2,6-dideoxy-4-O-(2,6-dideoxy-3-O-methyl-α-L-arabino-hexopyranosyl)-3-O-methyl-α-L-arabino-hexopyranoside; or bridged fused ring systems nomenclature: mixture of ≥80% (2aE,4E,8E)-(5'S,6S,6'R,7S,11R,13S,15S,17aR,20R,20aR,20bS)-6'-[(S)-sec-butyl]-5',6,6',7,10,11,14,15,17a,20,20a,20b-dodecahydro-20,20b-dihydroxy-5',6,8,19-tetramethyl-17-oxospiro[11,15-methano-2H,13H,17H-furo[4,3,2-pq][2,6]benzodioxacyclooctadecin-13,2'-[2H]pyran]-7-yl 2,6-dideoxy-4-O-(2,6-dideoxy-3-O-methyl-α-L-arabino-hexopyranosyl)-3-O-methyl-α-L-arabino-hexopyranoside and ≤20% (2aE,4E,8E)-(5'S,6S,6'R,7S,11R,13S,15S,17aR,20R,20aR,20bS)-5',6,6',7,10,11,14,15,17a,20,20a,20b-dodecahydro-20,20b-dihydroxy-6'-isopropyl-5',6,8,19-tetramethyl-17-oxospiro[11,15-methano-2H,13H,17H-furo[4,3,2-pq][2,6]benzodioxacyclooctadecin-13,2'-[2H]pyran]-7-yl 2,6-dideoxy-4-O-(2,6-dideoxy-3-O-methyl-α-L-arabino-hexopyranosyl)-3-O-methyl-α-L-arabino-hexopyranoside; CAS Reg. No. 71751-41-2);

(II-2) emamectin benzoate (IUPAC-name: extended von Baeyer nomenclature: mixture of ≥90% (10E,14E,16E)-(1R,4S,5'S.6S,6'R,8R,12S,13S,20R,21R,24S)-6'-[(S)-sec-butyl]-21,24-dihydroxy-5',11,13,22-tetramethyl-2-oxo-(3,7,19-trioxatetracyclo[15.6.1.1$^{4,8}$.0$^{20,24}$]pentacosa-10,14,16,22-tetraene)-6-spiro-2'-(5',6'-dihydro-2'H-pyran)-12-yl 2,6-dideoxy-3-O-methyl-4-O-(2,4,6-trideoxy-3-O-methyl-4-methylamino-α-L-lyxo-hexapyranosyl)-α-L-arabino-hexapyranoside benzoate and ≤10% (10E,14E,16E)-(1R,4S,5'S,6S,6'R,8R,12S,13S,20R,21R,24S)-21,24-dihydroxy-6'-isopropyl-5',11,13,22-tetramethyl-2-oxo-(3,7,19-trioxatetracyclo[15.6.1.1$^{4,8}$.0$^{20,24}$]pentacosa-10,14,16,22-tetraene)-6-spiro-2'-(5',6'-dihydro-2'H-pyran)-12-yl 2,6-dideoxy-3-O-methyl-4-O-(2,4,6-trideoxy-3-O-methyl-4-methylamino-α-L-lyxo-hexapyranosyl)-α-L-arabino-hexapyranoside benzoate; or bridged fused ring systems nomenclature: mixture of ≥90% (2aE,4E,8E)-(5'S,6S,6'R,7S,11R,13S,15S,17aR,20R,20aR,20bS)-6'-[(S)-sec-butyl]-5',6,6',7,10,11,14,15,17a,20,20a,20b-dodecahydro-20,20b-dihydroxy-5',6,8,19-tetramethyl-17-oxospiro[11,15-methano-2H,13H,17H-furo[4,3,2-pq][2,6]benzodioxacyclooctadecin-13,2'-[2H]pyran]-7-yl 2,6-dideoxy-3-O-methyl-4-O-(2,4,6-trideoxy-3-O-methyl-4-methylamino-α-L-lyxo-hexapyranosyl)-α-L-arabino-hexapyranoside benzoate and ≤10% (2aE,4E,8E)-(5'S,6S,6'R,7S,11R,13S,15S,17aR,20R,20aR,20bS)-5',6,6',7,10,11,14,15,17a,20,20a,20b-dodecahydro-20,20b-dihydroxy-6'-isopropyl-5',6,8,19-tetramethyl-17-oxospiro[11,15-methano-2H,13H,17H-furo[4,3,2-pq][2,6]benzodioxacyclooctadecin-13,2'-[2H]pyran]-7-yl 2,6-dideoxy-3-O-methyl-4-O-(2,4,6-trideoxy-3-O-methyl-4-methylamino-α-L-lyxo-hexapyranosyl)-α-L-arabino-hexapyranoside benzoate; CAS Reg. No. 155569-91-8 (formerly 137512-74-4 and 179607-18-2));

(II-3) lepimectin (IUPAC-name: extended von Baeyer nomenclature: mixture of 80-100% (10E,14E,16E)-(1R,4S,5'S,6R,CR,8R,12R,13S,20R,21R,24S)-6'-ethyl-21,24-dihydroxy-5',11,13,22-tetramethyl-2-oxo-(3,7,19-trioxatetracyclo[15.6.1.1$^{4,8}$.0$^{20,24}$]pentacosa-10,14,16,22-tetraene)-6-spiro-2'-(tetrahydropyran)-12-yl (Z)-2-methoxyimino-2-phenylacetate and 20-0% (10E,14E,16E)-(1R,4S,5'S,6R,6'R,8R,12R,13S,20R,21R,24S)-21,24-dihydroxy-5',6',11,13,22-pentamethyl-2-oxo-(3,7,19-trioxatetracyclo[15.6.1.1$^{4,8}$.0$^{20,24}$]pentacosa-10,14,16,22-tetraene)-6-spiro-2'-(tetrahydropyran)-12-yl (Z)-2-methoxyimino-2-phenylacetate; or bridged fused ring systems nomenclature: mixture of 80-100% (2aE,4E,8E)-(5'S,6S,6'R,7R,11R,13R,15S,17aR,20R,20aR,20bS)-6'-ethyl-3',4',5',6,6',7,10,11,14,15,17a,20,20a,20b-tetradecahydro-20,20b-dihydroxy-5',6,8,19-tetramethyl-17-oxospiro[11,15-methano-2H,13H,17H-furo[4,3,2-pq][2,6]benzodioxacyclooctadecin-13,2'-[2H]pyran]-7-yl (Z)-2-methoxyimino-2-phenylacetate and 20-0% (2aE,4E,8E)-(5'S,6S,6'R,7R,11R,13R,15S,17aR,20R,20aR,20bS)-3',4',5',6,6',7,10,11,14,15,17a,20,20a,20b-tetradecahydro-20,20b-dihydroxy-5',6,6',8,19-pentamethyl-17-oxospiro[11,15-methano-2H,13H,17H-furo[4,3,2-pq][2,6]benzodioxacyclooctadecin-13,2'-[2H]pyran]-7-yl (Z)-2-methoxyimino-2-phenylacetate; CAS Reg. No. 171249-05-1 (6'-ethyl) and 171249-10-8 (6'-methyl));

(II-4) milbemectin (IUPAC-name: extended von Baeyer nomenclature: mixture of 70% (10E,14E,16E)-(1R,4S,5'S,6R,6'R,8R,13R,20R,21R,24S)-6'-ethyl-21,24-dihydroxy-5',11,13,22-tetramethyl-(3,7,19-trioxatetracyclo[15.6.1.1$^{4,8}$.0$^{20,24}$]pentacosa-10,14,16,22-tetraene)-6-spiro-2'-(tetrahydropyran)-2-one and 30% (10E,14E,16E)-(1R,4S,5'S,6R,6'R,8R,13R,20R,21R,24S)-21,24-dihydroxy-5',6',11,13,22-pentamethyl-(3,7,19-trioxatetracyclo[15.6.1.1$^{4,8}$.0$^{20,24}$]pentacosa-10,14,16,22-tetraene)-6-spiro-2'-(tetrahydropyran)-2-one; or bridged fused ring systems nomenclature: mixture of 70% (2aE,4E,8E)-(5'S,6R,6'R,11R,13R,15S,17aR,20R,20aR,20bS)-6'-ethyl-3',4',5',6,6',7,10,11,14,15,17a,20,20a,20b-tetradecahydro-20,20b-dihydroxy-5',6,8,19-tetramethylspiro[11,15-methano-2H,13H,17H-furo[4,3,2-pq][2,6]benzodioxacyclooctadecin-13,2'-[2H]pyran]-17-one and 30% (2aE,4E,8E)-(5'S,6R,6'R,11R,13R,15S,17aR,20R,20aR,20bS)-3',4',5',6,6',7,10,11,14,15,17a,20,20a,20b-tetradecahydro-20,20b-dihydroxy-5',6,6',8,19-pentamethylspiro[11,15-methano-2H,13H,17H-furo[4,3,2-pq][2,6]benzodioxacyclooctadecin-13,2'-[2H]pyran]-17-one; CAS Reg. No. 51596-10-2 (milbemycin A$_3$)+51596-11-3 (milbemycin A$_4$));

(II-5) spirodiclofen (IUPAC-name: 3-(2,4-dichlorophenyl)-2-oxo-1-oxaspiro[4.5]dec-3-en-4-yl 2,2-dimethylbutyrate; CAS Reg. No. 148477-71-8);

(II-6) spiromesifen (IUPAC-name: 3-mesityl-2-oxo-1-oxaspiro[4.4]non-3-en-4-yl 3,3-dimethylbutyrate; CAS Reg. No. 283594-90-1);

(II-7) spirotetramat (IUPAC-name: cis-4-(ethoxycarbonyloxy)-8-methoxy-3-(2,5-xylyl)-1-azaspiro[4.5]dec-3-en-2-one; CAS Reg. No. 203313-25-1);

(II-8) cyenopyrafen (IUPAC-name: (E)-2-(4-tert-butylphenyl)-2-cyano-1-(1,3,4-trimethylpyrazol-5-yl)vinyl 2,2-dimethylpropionate; CAS Reg. No. 560121-52-0);

(II-9) cyflumetofen (IUPAC-name: 2-methoxyethyl (RS)-2-(4-tert-butylphenyl)-2-cyano-3-oxo-3-(α,α,α-trifluoro-o-tolyl)propionate; CAS Reg. No. 400882-07-7);

(II-10) spinosad (IUPAC-name: mixture of 50-95% (2R,3aS,5aR,5bS,9S,13S,14R,16aS,16bR)-2-(6-deoxy-2,3,4-tri-O-methyl-α-L-mannopyranosyloxy)-13-(4-dimethylamino-2,3,4,6-tetradeoxy-β-D-erythropyranosyloxy)-9-ethyl-2,3,3a,5a,5b,6,7,9,10,11,12,13,14,15,16a,16b-hexadecahydro-14-methyl-1H-as-indaceno[3,2-d]oxacyclododecine-7,15-dione and 50-5% (2S,3aR,5aS,5bS,9S,13S,14R,16aS,16bS)-2-(6-deoxy-2,3,4-tri-O-methyl-α-L-mannopyranosyloxy)-13-(4-dimethylamino-2,3,4,6-tetradeoxy-13-D-erythropyranosyloxy)-9-ethyl-2,3,3a,5a,5b,6,7,9,10,11,12,13,14,15,16a,16b-hexadecahydro-4,14-dimethyl-1H-as-indaceno[3,2-d]oxacyclododecine-7,15-dione; CAS Reg. No. 168316-95-8 (131929-60-7+131929-63-0));

(II-11) spinetoram (IUPAC-name: bridged fused ring systems nomenclature: mixture of 50-90% (2R,3aR,5aR,5bS, 9S,13S,14R,16aS,16bR)-2-(6-deoxy-3-O-ethyl-2,4-di-O-methyl-α-L-mannopyranosyloxy)-13-[(2R,5S,6R)-5-(dimethylamino)tetrahydro-6-methylpyran-2-yloxy]-9-ethyl-2,3,3a,4,5,5a,5b,6,9,10,11,12,13,14,16a,16b-hexadecahydro-14-methyl-1H-as-indaceno[3,2-d]oxacyclododecine-7,15-dione and 50-10% (2S,3aR,5aS,5bS,9S,13S,14R,16aS,16bS)-2-(6-deoxy-3-O-ethyl-2,4-di-O-methyl-α-L-mannopyranosyloxy)-13-[(2R,5S,6R)-5-(dimethylamino)tetrahydro-6-methylpyran-2-yloxy]-9-ethyl-2,3,3a,5a,5b,6,9,10,11,12,13,14,16a,16b-tetradecahydro-4,14-dimethyl-1H-as-indaceno[3,2-c]oxacyclododecine-7,15-dione; or extended von Baeyer nomenclature: mixture of 50-90% (1S,2R,5R,7R,9R,10S,14R,15S,19S)-7-(6-deoxy-3-O-ethyl-2,4-di-O-methyl-α-L-mannopyranosyloxy)-15-[(2R,5S,6R)-5-(dimethylamino)tetrahydro-6-methylpyran-2-yloxy]-19-ethyl-14-methyl-20-oxatetracyclo[10.10.0.0$^{2,10}$.0$^{5,9}$]docos-11-ene-13,21-dione and 50-10% (1S,2S,5R,7S,9S,10S,14R,15S,19S)-7-(6-deoxy-3-O-ethyl-2,4-di-O-methyl-α-L-mannopyranosyloxy)-15-[(2R,5S,6R)-5-(dimethylamino)tetrahydro-6-methylpyran-2-yloxy]-19-ethyl-4,14-dimethyl-20-oxatetracyclo[10.10.0.0$^{2,10}$.0$^{5,9}$]docosa-3,11-diene-13,21-dione; CAS Reg. No. 187166-40-1+187166-15-0);

(II-12) flonicamid (IUPAC-name: N-cyanomethyl-4-(trifluoromethyl)nicotinamide; CAS Reg. No. 158062-67-0);

(II-13) pymetrozine (IUPAC-name: (E)-4,5-dihydro-6-methyl-4-(3-pyridylmethyleneamino)-1,2,4-triazin-3(2H)-one; CAS Reg. No. 123312-89-0);

(II-14) pyflubumide (IUPAC-name: 3'-isobutyl-N-isobutyryl-1,3,5-trimethyl-4'-[2,2,2-trifluoro-1-methoxy-1-(trifluoromethyl)ethyl]pyrazole-4-carboxanilide; CAS Reg. No. 926914-55-8).

Especially preferred mixing partners from the Insecticide Groups (IRAC classification groups) (5), (6), (9), (15), (23), (25) and (29) are:

(II-1) abamectin, (II-2) emamectin benzoate, (II-4) milbemectin, (II-6) spiromesifen, (II-7) spirotetramat, (II-8) cyenopyrafen, (II-9) cyflumetofen, (II-10) spinosad and (II-14) pyflubumide.

One preferred embodiment refers to combinations comprising a compound of formula (I) and a compound of group (II) selected from the mixing partners from the Insecticide Groups (IRAC classification groups) (5), (6), (9), (15), (23), (25) and (29) defined above as being preferred.

One preferred embodiment refers to combinations comprising a compound of formula (I) and a compound of group (II) selected from the mixing partners from the Insecticide Groups (IRAC classification groups) (5), (6), (9), (15), (23), (25) and (29) defined above as being more preferred.

Another preferred embodiment refers to combinations comprising a compound of formula (I) and a compound of group (II) selected from the mixing partners from the Insecticide Groups (IRAC classification groups) (5), (6), (9), (15), (23), (25) and (29) defined above as being especially preferred.

Another preferred embodiment refers to combinations comprising a compound of formula (I) and (II-1) abamectin.

Another preferred embodiment refers to combinations comprising a compound of formula (I) and (II-2) emamectin benzoate.

Another preferred embodiment refers to combinations comprising a compound of formula (I) and (II-4) milbemectin.

Another preferred embodiment refers to combinations comprising a compound of formula (I) and (II-6) spiromesifen.

Another preferred embodiment refers to combinations comprising a compound of formula (I) and (II-7) spirotetramat.

Another preferred embodiment refers to combinations comprising a compound of formula (I) and (II-8) cyenopyrafen.

Another preferred embodiment refers to combinations comprising a compound of formula (I) and (II-9) cyflumetofen.

Another preferred embodiment refers to combinations comprising a compound of formula (I) and (II-10) spinosad.

Another preferred embodiment refers to combinations comprising a compound of formula (I) and (II-14) pyflubumide.

(b) More preferred mixing partners from the group consisting of (b) compounds of formula (IIa) or (IIb) or (IIc) or (IIc') are:

Compound of formula (IIa), compound of formula (IIb), compound of formula (IIc), compound of formula (IIc').

Especially preferred mixing partners from the group consisting of (b) compounds of formula (IIa) or (IIb) are:

Compound of formula (IIa), compound of formula (IIb).

Another preferred embodiment refers to combinations comprising a compound of formula (I) and a compound of formula (IIa).

Another preferred embodiment refers to combinations comprising a compound of formula (I) and a compound of formula (IIb).

Another individual embodiment refers to combinations comprising a compound of formula (I) and a compound of formula (IIc).

Another individual embodiment refers to combinations comprising a compound of formula (I) and a compound of formula (IIc').

Mixing Ratio

The synergistic effect is particularly pronounced when the active compounds in the active compound combinations according to the invention are present in certain weight ratios. However, the weight ratios of the active compounds in the active compound combinations can be varied within a relatively wide range. In general, the combinations according to the invention comprise an active compound (I) and an active compound of group (II) selected from (a) Insecticide Groups (5), (6), (9), (15), (23), (25) and (29) and (b) compounds of formula (IIa) or (IIb) or (IIc) or (IIc') in the following preferred, more preferred and particularly preferred mixing ratios:

Preferred mixing ratio: 125:1 to 1:125 such as 100:1 to 1:100 or 75:1 to 1:75.

More preferred mixing ratio: 50:1 to 1:50 such as 50:1 to 1:15 or 1:15 to 50:1 or even 20:1 to 1:20 or 20:1 to 1:15 or 15:1 to 1:20 or 15:1 to 1:15 or 10:1 to 1:10 or 5:1 to 1:5.

Particularly preferred mixing ratios for some specific combinations of compound of formula (I) and a compound of group (II) are provided in table 1. Thus, each individual active compound combination of a compound of formula (I) and the indicated mixing partner of group (II) in each of the indicated mixing ratios is a preferred embodiment of the invention.

TABLE 1

| Mixing partner of group (II) | Mixing ratios |
|---|---|
| (II-1) abamectin | 400:1 to 1:1 or 400:1 to 20:1 or 20:1 to 2:1 |
| (II-2) emamectin benzoate | 50:1 to 1:1 or 40:1 to 1:1 or 40:1 to 4:1 |
| (II-4) milbemectin | 25:1 to 1:5 or 5:1 to 1:5 or 1:1 to 1:2.5 |

TABLE 1-continued

| Mixing partner of group (II) | Mixing ratios |
| --- | --- |
| (II-6) spiromesifen | 20:1 to 1:10 or 10:1 to 1:5 or 10:1 to 1:1 |
| (II-7) spirotetramat | 30:1 to 1:30 or 10:1 to 1:30 |
| (II-8) cyenopyrafen | 10:1 to 1:10 or 5:1 to 1:5 or 4:1 to 1:3 or 4:1 |
| (II-9) cyflumetofen | 10:1 to 1:20 or 5:1 to 1:5 or 2:1 to 1:2 or 1:1 |
| (II-10) spinosad | 10:1 to 1:10 or 5:1 to 1:5 or 4:1 to 1:1 or 4:1 |
| (II-14) pyflubumide | 20:1 to 1:20 or 10:1 to 1:10 or 10:1 to 1:1 |
| compound of formula (IIa) | 10:1 to 1:10 or 5:1 to 1:5 or 1:1 to 1:3 or 1:2 |
| compound of formula (IIb) | 10:1 to 1:10 or 5:1 to 1:5 or 2:1 to 1:2 or 1:1 |
| compound of formula (IIc) | 10:1 to 1:10 or 5:1 to 1:5 or 2:1 to 1:2 or 1:1 |
| compound of formula (IIc') | 10:1 to 1:10 or 5:1 to 1:5 or 2:1 to 1:2 or 1:1 |

The mixing ratios are based on weight ratios. The ratio is to be understood as meaning active compound of the formula (I): an active compound of group (II).

Additional Mixing Partners

Furthermore, the active compound combinations according to the invention and, in particular, the active compound combinations listed in table 1, may contain one or more further active substances selected from a fungicide, an insecticide or a biological control agent, i.e. at least one further fungicidally or insecticidally active additive. Preferably, such further active additive is selected from groups (1) to (30) mentioned below. The active compounds identified here by their common names are known and are described, for example, in the pesticide handbook ("The Pesticide Manual" 16th Ed., British Crop Protection Council 2012) or can be found on the Internet (e.g. http://www.alanwood.net/pesticides). The classification is based on the current IRAC Mode of Action Classification Scheme at the time of filing of this patent application.

(1) Acetylcholinesterase (AChE) inhibitors, preferably carbamates selected from alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb, or organophosphates selected from acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, preferably cyclodiene-organochlorines selected from chlordane and endosulfan or phenylpyrazoles (fiproles), for example ethiprole and fipronil.

(3) Sodium channel modulators, preferably pyrethroids selected from acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, pyrethrins (pyrethrum), resmethrin, silafluofen, tefluthrin, tetramethrin, tetramethrin [(1R)-isomer)], tralomethrin and transfluthrin or DDT or methoxychlor.

(4) Nicotinic acetylcholine receptor (nAChR) competitive modulators, preferably neonicotinoids selected from acetamiprid, clothianidin, dinotefuran, imidacloprid, nitenpyram, thiacloprid and thiamethoxam or nicotine or sulfoxaflor or flupyradifurone.

(5) Nicotinic acetylcholine receptor (nAChR) allosteric modulators, preferably spinosyns selected from spinetoram and spinosad.

(6) Glutamate-gated chloride channel (GluCl) allosteric modulators, preferably avermectins/milbemycins selected from abamectin, emamectin benzoate, lepimectin and milbemectin.

(7) Juvenile hormone mimics, preferably juvenile hormone analogues selected from hydroprene, kinoprene and methoprene, or fenoxycarb or pyriproxyfen.

(8) Miscellaneous non-specific (multi-site) inhibitors, preferably alkyl halides selected from methyl bromide and other alkyl halides, or chloropicrine or sulphuryl fluoride or borax or tartar emetic or methyl isocyanate generators selected from diazomet and metam.

(9) Chordotonal organ TRPV channel modulators selected from pymetrozine and pyrifluquinazone.

(10) Mite growth inhibitors selected from clofentezine, hexythiazox, diflovidazin and etoxazole.

(11) Microbial disruptors of the insect gut membrane selected from Bacillus thuringiensis subspecies israelensis, Bacillus sphaericus, Bacillus thuringiensis subspecies aizawai, Bacillus thuringiensis subspecies kurstaki, Bacillus thuringiensis subspecies tenebrionis, and B.t. plant proteins selected from Cry1Ab, Cry1Ac, Cry1Fa, Cry1A.105, Cry2Ab, Vip3A, mCry3A, Cry3Ab, Cry3Bb and Cry34Ab1/35Ab1.

(12) Inhibitors of mitochondrial ATP synthase, preferably ATP disruptors selected from diafenthiuron, or organotin compounds selected from azocyclotin, cyhexatin and fenbutatin oxide, or propargite or tetradifon.

(13) Uncouplers of oxidative phosphorylation via disruption of the proton gradient selected from chlorfenapyr, DNOC and sulfluramid.

(14) Nicotinic acetylcholine receptor channel blockers selected from bensultap, cartap hydrochloride, thiocylam and thiosultap-sodium.

(15) Inhibitors of chitin biosynthesis, type 0, selected from bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1 selected from buprofezin.

(17) Moulting disruptor (in particular for Diptera, i.e. dipterans) selected from cyromazine.

(18) Ecdysone receptor agonists selected from chromafenozide, halofenozide, methoxyfenozide and tebufenozide.

(19) Octopamine receptor agonists selected from amitraz.

(20) Mitochondrial complex III electron transport inhibitors selected from hydramethylnone, acequinocyl and fluacrypyrim.

(21) Mitochondrial complex I electron transport inhibitors, preferably METI acaricides selected from fenazaquin, fenpyroximate, pyrimidifen, pyridaben, tebufenpyrad and tolfenpyrad, or rotenone (Derris).

(22) Voltage-dependent sodium channel blockers selected from indoxacarb and metaflumizone.

(23) Inhibitors of acetyl CoA carboxylase, preferably tetronic and tetramic acid derivatives selected from spirodiclofen, spiromesifen and spirotetramat.

(24) Mitochondrial complex IV electron transport inhibitors, preferably phosphines selected from aluminium phosphide, calcium phosphide, phosphine and zinc phosphide, or cyanides selected from calcium cyanide, potassium cyanide and sodium cyanide.

(25) Mitochondrial complex II electron transport inhibitors, preferably beta-ketonitrile derivatives selected from cyenopyrafen and cyflumetofen, and carboxanilides selected from pyflubumide.

(28) Ryanodine receptor modulators, preferably diamides selected from chlorantraniliprole, cyantraniliprole and flubendiamide.

(29) Chordotonal organ Modulators (with undefined target site) selected from flonicamid.

(30) further active compounds selected from Afidopyropen, Afoxolaner, Azadirachtin, Benclothiaz, Benzoximate, Bifenazate, Broflanilide, Bromopropylate, Chinomethionat, Chlorprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BioNeem, Votivo), and also the following compounds: 1-{2-fluoro-4-methyl-5-[(2,2,2-trifluoroethyl)sulphinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS 1204776-60-2), N-[(2E)-1-[(6-chloropyridin-3-yl)methyl]pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-soxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9); N-[4-chloro-2-[[(1,1-dimethylethyl)amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4aS)-7-chloro-2,5-dihydro-2-[[(methoxycarbonyl) [4-[(trifluoromethyl)thio]phenyl] amino]carbonyl]-indeno[1,2-e][1,3,4]oxadiazine-4a (3H)-carboxylic acid methyl ester (known from CN 102391261 A) (CAS 1370358-69-2); 6-deoxy-3-O-ethyl-2,4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl] methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS 1229023-34-0), 3-(4-chloro-2,6-dimethylphenyl)-8-methoxy-1-methyl-1,8-diazaspiro[4.5]decane-2,4-dione (known from WO 2014/187846

A1) (CAS 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012029672 A1) (CAS 1363400-41-2), [N(E)]-N-[1-[(6-chloro-3-pyridinyl)methyl]-2(1H)-pyridinylidene]-2,2,2-trifluoro-acetamide, (known from WO 2016005276 A1) (CAS 1689566-03-7), [N(Z)]-N-[1-[(6-chloro-3-pyridinyl)methyl]-2(1H)-pyridinylidene]-2,2,2-trifluoro-acetamide, (CAS 1702305-40-5), 3-endo-3-[2-propoxy-4-(trifluoromethyl)phenoxy]-9-[[5-(trifluoromethyl)-2-pyridinyl]oxy]-9-azabicyclo[3.3.1] nonane (known from WO 2011/105506 A1, WO 2016/133011 A1) (CAS 1332838-17-1).

The active compound combinations can preferably be used as pesticides. They are active against normally sensitive and resistant species and against all or some stages of development. The abovementioned pests include:

pests from the phylum of the Arthropoda, in particular from the class of the Arachnida, for example *Acarus* spp., for example *Acarus siro, Aceria kuko, Aceria sheldoni, Aculops* spp., *Aculus* spp., for example *Aculus fockeui, Aculus schlechtendali, Amblyomma* spp., *Amphitetranychus viennensis, Argas* spp., *Boophilus* spp., *Brevipalpus* spp., for example *Brevipalpus phoenicis, Bryobia graminum, Bryobia praetiosa, Centruroides* spp., *Chorioptes* spp., *Dermanyssus gallinae, Dermatophagoides pteronyssinus, Dermatophagoides farinae, Dermacentor* spp., *Eotetranychus* spp., for example *Eotetranychus hicoriae, Epitrimerus pyri, Eutetranychus* spp., for example *Eutetranychus banksi, Eriophyes* spp., for example *Eriophyes pyri, Glycyphagus domesticus, Halotydeus destructor, Hemitarsonemus* spp., for example *Hemitarsonemus latus* (=*Polyphagotarsonemus latus*), *Hyalomma* spp., *Ixodes* spp., *Latrodectus* spp., *Loxosceles* spp., *Neutrombicula autumnalis, Nuphersa* spp., *Oligonychus* spp., for example *Oligonychus coffeae, Oligonychus coniferarum, Oligonychus ilicis, Oligonychus indicus, Oligonychus mangiferus, Oligonychus pratensis, Oligonychus punicae, Oligonychus yothersi, Ornithodorus* spp., *Ornithonyssus* spp., *Panonychus* spp., for example *Panonychus citri* (=*Metatetranychus citri*), *Panonychus ulmi* (=*Metatetranychus ulmi*), *Phyllocoptruta oleivora, Platytetranychus multidigituli, Polyphagotarsonemus latus, Psoroptes* spp., *Rhipicephalus* spp., *Rhizoglyphus* spp., *Sarcoptes* spp., *Scorpio maurus, Steneotarsonemus* spp., *Steneotarsonemus spinki, Tarsonemus* spp., for example *Tarsonemus confusus, Tarsonemus pallidus, Tetranychus* spp., for example *Tetranychus canadensis, Tetranychus cinnabarinus, Tetranychus turkestani, Tetranychus urticae, Trombicula alfreddugesi, Vaejovis* spp., *Vasates lycopersici;* from the class of the Chilopoda, for example *Geophilus* spp., *Scutigera* spp.;

from the order or the class of the Collembola, for example *Onychiurus armatus; Sminthurus viridis;* from the class of the Diplopoda, for example *Blaniulus guttulatus;* from the class of the Insecta, for example from the order of the Blattodea, for example *Blatta orientalis, Blattella asahinai, Blattella germanica, Leucophaea maderae, Loboptera decipiens, Neostylopyga rhombifolia, Panchlora* spp., *Parcoblatta* spp., *Periplaneta* spp., for example *Periplaneta americana, Periplaneta australasiae, Pycnoscelus surinamensis, Supella longipalpa;* from the order of the Coleoptera, for example *Acalymma vittatum, Acanthoscelides obtectus, Adoretus* spp., *Aethina tumida, Agelastica alni, Agrilus* spp., for example *Agrilus planipennis, Agrilus coxalis, Agrilus bilineatus, Agrilus anxius, Agriotes* spp., for example *Agriotes linneatus, Agriotes mancus, Alphitobius diaperinus, Amphimallon solstitialis, Anobium punctatum, Anoplophora* spp., for example *Anoplophora glabripennis, Anthonomus* spp., for example *Anthonomus grandis, Anthrenus* spp., *Apion* spp., *Apogonia* spp., *Atomaria* spp., for example *Atomaria linearis, Attagenus* spp., *Baris caerulescens, Bruchidius obtectus, Bruchus* spp., for example *Bruchus pisorum, Bruchus rufimanus, Cassida* spp., *Cerotoma trifurcata, Ceutorrhynchus* spp., for example *Ceutorrhynchus assimilis, Ceutorrhynchus quadridens, Ceutorrhynchus rapae, Chaetocnema* spp., for example *Chaetocnema confinis, Chaetocnema denticulata, Chaetocnema ectypa, Cleonus mendicus, Conoderus* spp., *Cosmopolites* spp., for example *Cosmopolites sordidus, Costelytra zealandica, Ctenicera* spp., *Curculio* spp., for example *Curculio caryae, Curculio caryatrypes, Curculio obtusus, Curculio sayi, Cryptolestes ferrugineus, Cryptolestes pusillus, Cryptorhynchus lapathi, Cryptorhynchus mangiferae, Cylindrocopturus* spp., *Cylindrocopturus adspersus, Cylindrocopturus furnissi, Dendroctonus* spp., for example *Dendroctonus ponderosae, Dermestes* spp., *Diabrotica* spp., for example *Diabrotica balteata, Diabrotica barberi, Diabrotica undecimpunctata howardi, Diabrotica undecimpunctata undecimpunctata, Diabrotica virgifera virgifera, Diabrotica virgifera zeae, Dichocrocis* spp., *Dicladispa armigera, Diloboderus* spp., *Epicaerus* spp., *Epilachna* spp., for example *Epilachna borealis, Epilachna varivestis, Epitrix* spp., for example *Epitrix cucumeris, Epitrix fuscula, Epitrix hirtipennis, Epitrix subcrinita, Epitrix tuberis, Faustinus* spp., *Gibbium psylloides, Gnathocerus cornutus, Hellula undalis, Heteronychus arator, Heteronyx* spp., *Hylamorpha elegans, Hylotrupes bajulus, Hypera postica, Hypomeces squamosus, Hypothenemus* spp., for example *Hypothenemus hampei, Hypothenemus obscurus, Hypothenemus pubescens, Lachnosterna consanguinea, Lasioderma serricorne, Latheticus oryzae, Lathridius* spp., *Lema* spp., *Leptinotarsa decemlineata, Leucoptera* spp., for example *Leucoptera coffeella, Limonius ectypus, Lissorhoptrus oryzophilus, Listronotus* (=*Hyperodes*) spp., *Lixus* spp., *Luperodes* spp., *Luperomorpha xanthodera, Lyctus* spp., *Megacyllene* spp., for example *Megacyllene robiniae, Megascelis* spp., *Melanotus* spp., for example *Melanotus longulus oregonensis, Meligethes aeneus, Melolontha* spp., for example *Melolontha melolontha, Migdolus* spp., *Monochamus* spp., *Naupactus xanthographus, Necrobia* spp., *Neogalerucella* spp., *Niptus hololeucus, Oryctes rhinoceros, Oryzaephilus surinamensis, Oryzaphagus oryzae, Otiorhynchus* spp., for example *Otiorhynchus cribricollis, Otiorhynchus ligustici, Otiorhynchus ovatus, Otiorhynchus rugosostriarus, Otiorhynchus sulcatus, Oulema* spp., for example *Oulema melanopus, Oulema oryzae, Oxycetonia jucunda, Phaedon cochleariae, Phyllophaga* spp., *Phyllophaga helleri, Phyllotreta* spp., for example *Phyllotreta armoraciae, Phyllotreta pusilla, Phyllotreta ramosa, Phyllotreta striolata, Popillia japonica, Premnotrypes* spp., *Prostephanus truncatus, Psylliodes* spp., for example *Psylliodes affinis, Psylliodes chrysocephala, Psylliodes punctulata, Ptinus* spp., *Rhizobius ventralis, Rhizopertha dominica, Rhynchophorus* spp., *Rhynchophorus ferrugineus, Rhynchophorus palmarum, Scolytus* spp., for example *Scolytus multistriatus, Sinoxylon perforans, Sitophilus* spp., for example *Sitophilus granarius, Sitophilus linearis, Sitophilus oryzae, Sitophilus zeamais, Sphenophorus* spp., *Stegobium paniceum, Sternechus* spp., for example *Sternechus paludatus, Symphyletes* spp., *Tanymecus* spp., for example *Tanymecus dilaticollis, Tanymecus indicus, Tanymecus palliatus, Tenebrio molitor, Tenebrioides mauretanicus, Tribolium* spp., for example *Tribolium audax, Tribolium castaneum, Tribolium confusum, Trogoderma* spp., *Tychius* spp., *Xylotrechus* spp., *Zabrus* spp., for example *Zabrus tenebrioides;* from the order of the Dermaptera, for example *Anisolabis maritime, Forficula auricularia, Labidura riparia;* from the order of the Diptera, for example *Aedes* spp., for example *Aedes aegypti, Aedes albopictus, Aedes sticticus, Aedes vexans, Agromyza* spp., for example *Agromyza frontella, Agromyza parvicornis, Anastrepha* spp., *Anopheles* spp., for example *Anopheles quadrimaculatus, Anopheles gambiae, Asphondylia* spp., *Bactrocera* spp., for example *Bactrocera cucurbitae, Bactrocera dorsalis, Bactrocera oleae, Bibio hortulanus, Calliphora erythrocephala, Calliphora vicina, Ceratitis capitata, Chironomus* spp., *Chrysomya* spp., *Chrysops* spp., *Chrysozona pluvialis, Cochliomya* spp., *Contarinia* spp., for example *Contarinia johnsoni, Contarinia nasturtii, Contarinia pyrivora, Contarinia schulzi, Contarinia sorghicola, Contarinia tritici, Cordylobia anthropophaga, Cricotopus sylvestris, Culex* spp., for example *Culex pipiens, Culex quinquefasciatus, Culicoides* spp., *Culiseta* spp., *Cuterebra* spp., *Dacus oleae, Dasineura* spp., for example *Dasineura brassicae, Delia* spp., for example *Delia antiqua, Delia coarctata, Delia florilega, Delia platura, Delia radicum, Dermatobia hominis, Drosophila* spp., for example *Drosphila melanogaster, Drosophila suzukii, Echinocnemus* spp., *Euleia heraclei, Fannia* spp., *Gasterophilus* spp., *Glossina* spp., *Haematopota* spp., *Hydrellia* spp., *Hydrellia griseola, Hylemya* spp., *Hippobosca* spp., *Hypoderma* spp., *Liriomyza* spp., for example *Liriomyza brassicae, Liriomyza huidobrensis, Liriomyza sativae, Lucilia* spp., for example *Lucilia cuprina, Lutzomyia* spp., *Mansonia* spp., *Musca* spp., for example *Musca domestica, Musca domestica vicina, Oestrus* spp., *Oscinella frit, Paratanytarsus* spp., *Paralauterborniella subcincta, Pegomya* or *Pegomyia* spp., for example *Pegomya betae, Pegomya hyoscyami, Pegomya rubivora, Phlebotomus* spp., *Phorbia* spp., *Phormia* spp., *Piophila casei, Platyparea poeciloptera, Prodiplosis* spp., *Psila rosae, Rhagoletis* spp., for example *Rhagoletis cingulata, Rhagoletis completa, Rhagoletis fausta, Rhagoletis indifferens, Rhagoletis mendax, Rhagoletis pomonella, Sarcophaga* spp., *Simulium* spp., for example *Simulium meridionale, Stomoxys* spp., *Tabanus* spp., *Tetanops* spp., *Tipula* spp., for example *Tipula paludosa, Tipula simplex, Toxotrypana curvicauda;* from the order of the Hemiptera, for example *Acizzia acaciaebaileyanae, Acizzia dodonaeae, Acizzia uncatoides, Acrida turrita, Acyrthosipon* spp., for example *Acyrthosiphon pisum, Acrogonia* spp., *Aeneolamia* spp., *Agonoscena* spp., *Aleurocanthus* spp., *Aleyrodes proletella, Aleurolobus barodensis, Aleurothrixus floccosus, Allocaridara malayensis, Amrasca* spp., for example *Amrasca bigutulla, Amrasca devastans, Anuraphis cardui, Aonidiella* spp., for example *Aonidiella aurantii, Aonidiella citrina, Aonidiella inornata, Aphanostigma pini, Aphis* spp., for example *Aphis citricola, Aphis craccivora, Aphis fabae, Aphis forbesi, Aphis glycines, Aphis gossypii, Aphis hederae, Aphis illinoisensis, Aphis middletoni, Aphis nasturtii, Aphis nerii, Aphis pomi, Aphis spiraecola, Aphis viburniphila, Arboridia apicalis, Arytainilla* spp., *Aspidiella* spp., *Aspidiotus* spp., for example *Aspidiotus nerii, Atanus* spp., *Aulacorthum solani, Bemisia tabaci, Blastopsylla occidentalis, Boreioglycaspis melaleucae, Brachycaudus helichrysi, Brachycolus* spp., *Brevicoryne brassicae, Cacopsylla* spp., for example *Cacopsylla pyricola, Calligypona marginata, Capulinia* spp., *Carneocephala fulgida, Ceratovacuna lanigera, Cercopidae, Ceroplastes* spp., *Chaetosiphon fragaefolii, Chionaspis tegalensis, Chlorita onukii, Chondracris rosea, Chromaphis juglandicola, Chrysomphalus aonidum, Chrysomphalus ficus, Cicadulina mbila, Coccomytilus halli, Coccus* spp., for example *Coccus hesperidum, Coccus longulus, Coccus pseudomagnoliarum, Coccus viridis, Cryptomyzus ribis, Cryptoneossa* spp., *Ctenarytaina* spp., *Dalbulus* spp., *Dialeurodes chittendeni, Dialeurodes citri, Diaphorina citri, Diaspis* spp., *Diuraphis* spp., *Doralis* spp., *Drosicha* spp., *Dysaphis* spp., for example *Dysaphis apiifolia, Dysaphis plantaginea, Dysaphis tulipae, Dysmicoccus* spp., *Empoasca* spp., for example *Empoasca abrupta, Empoasca fabae, Empoasca maligna, Empoasca solana, Empoasca stevensi, Eriosoma* spp., for example *Eriosoma americanum, Eriosoma lanigerum, Eriosoma pyricola, Erythroneura* spp., *Eucalyptolyma* spp., *Euphyllura* spp., *Euscelis bilobatus, Ferrisia* spp., *Fiorinia* spp., *Furcaspis oceanica, Geococcus coffeae, Glycaspis* spp., *Heteropsylla cubana, Heteropsylla spinulosa, Homalodisca coagulata, Hyalopterus arundinis, Hyalopterus pruni, Icerya* spp., for example *Icerya purchasi, Idiocerus* spp., *Idioscopus* spp., *Laodelphax striatellus, Lecanium* spp., for example *Lecanium corni (=Parthenolecanium corni), Lepidosaphes* spp., for example *Lepidosaphes ulmi, Lipaphis erysimi, Lopholeucaspis japonica, Lycorma delicatula, Macrosiphum* spp., for example *Macrosiphum euphorbiae, Macrosiphum lilii, Macrosiphum rosae, Macrosteles facifrons, Mahanarva* spp., *Melanaphis sacchari, Metcalfiella* spp., *Metcalfa pruinosa, Metopolophium dirhodum, Monellia costalis, Monelliopsis pecanis, Myzus* spp., for example *Myzus ascalonicus, Myzus cerasi, Myzus ligustri, Myzus ornatus, Myzus persicae, Myzus nicotianae, Nasonovia ribisnigri, Neomaskellia* spp., *Nephotettix* spp., for example *Nephotettix cincticeps Nephotettix nigropictus, Nettigonicla spectra, Nilaparvata lugens, Oncometopia* spp., *Orthezia praelonga, Oxya chinensis, Pachypsylla* spp., *Parabemisia myricae, Paratrioza* spp., for example *Paratrioza cockerelli, Parlatoria* spp., *Pemphigus* spp., for example *Pemphigus bursarius, Pemphigus populivenae, Peregrinus maidis, Perkinsiella* spp., *Phenacoccus* spp., for example *Phenacoccus madeirensis, Phloeomyzus passerinii, Phorodon humuli, Phylloxera* spp., for example *Phylloxera devastatrix, Phylloxera notabilis, Pinnaspis aspidistrae, Planococcus* spp., for example *Planococcus citri, Prosopidopsylla flava, Protopulvinaria pyriformis, Pseudaulacaspis pentagona, Pseudococcus* spp., for example *Pseudococcus calceolariae, Pseudococcus comstocki, Pseudococcus longispinus, Pseudococcus maritimus, Pseudococcus viburni, Psyllopsis* spp., *Psylla* spp., for example *Psylla buxi, Psylla mali, Psylla pyri, Pteromalus* spp., *Pulvinaria* spp., *Pyrilla* spp., *Quadraspidiotus* spp., for example *Quadraspidiotus juglansregiae, Quadraspidiotus ostreaeformis, Quadraspidiotus perniciosus, Quesada gigas, Rastrococcus* spp., *Rhopalosiphum* spp., for example *Rhopalosiphum maidis, Rhopalosiphum oxyacanthae, Rhopalosiphum padi, Rhopalosiphum rufiabdominale, Saissetia* spp., for example *Saissetia coffeae, Saissetia miranda, Saissetia neglecta, Saissetia oleae, Scaphoideus titanus, Schizaphis graminum, Selenaspidus articulatus, Sipha flava, Sitobion avenae, Sogata* spp., *Sogatella furcifera, Sogatodes* spp., *Stictocephala festina, Siphoninus phillyreae, Tenalaphara malayensis, Tetragonocephela* spp., *Tinocallis caryaefoliae, Tomaspis* spp., *Toxoptera* spp., for example *Toxoptera aurantii, Toxoptera citricidus, Trialeurodes vaporariorum, Trioza* spp., for example *Trioza diospyri, Typhlocyba* spp., *Unaspis* spp., *Viteus vitifolii, Zygina* spp.;

from the suborder of the Heteroptera, for example *Aelia* spp., *Anasa tristis, Antestiopsis* spp., *Boisea* spp., *Blissus* spp., *Calocoris* spp., *Campylomma livida, Cavelerius* spp., *Cimex* spp., for example *Cimex adjunctus, Cimex hemipterus, Cimex lectularius, Cimex pilosellus, Collaria* spp., *Creontiades dilutus, Dasynus piperis, Dichelops furcatus, Diconocoris hewetti, Dysdercus* spp., *Euschistus* spp., for example *Euschistus heros, Euschistus servus, Euschistus tristigmus, Euschistus variolarius, Eurydema* spp., *Eurygaster* spp., *Halyomorpha halys, Heliopeltis* spp., *Horcias nobilellus, Leptocorisa* spp., *Leptocorisa varicornis, Leptoglossus occidentalis, Leptoglossus phyllopus, Lygocoris* spp., for example *Lygocoris pabulinus, Lygus* spp., for example *Lygus elisus, Lygus hesperus, Lygus lineolaris, Macropes excavatus, Megacopta cribraria, Miridae, Monalonion atratum, Nezara* spp., for example *Nezara viridula, Nysius* spp., *Oebalus* spp., *Pentomidae, Piesma quadrata, Piezodorus* spp., for example *Piezodorus guildinii, Psallus* spp., *Pseudacysta persea, Rhodnius* spp., *Sahlbergella singularis, Scaptocoris castanea, Scotinophora* spp., *Stephanitis nashi, Tibraca* spp., *Triatoma* spp.;

from the order of the Hymenoptera, for example *Acromyrmex* spp., *Athalia* spp., for example *Athalia rosae, Atta* spp., *Camponotus* spp., *Dolichovespula* spp., *Diprion* spp., for example *Diprion similis, Hoplocampa* spp., for example *Hoplocampa cookei, Hoplocampa testudinea, Lasius* spp., *Linepithema (Iridiomyrmex) humile, Monomorium pharaonis, Paratrechina* spp., *Paravespula* spp., *Plagiolepis* spp., *Sirex* spp., for example *Sirex noctilio, Solenopsis invicta, Tapinoma* spp., *Technomyrmex albipes, Urocerus* spp., *Vespa* spp., for example *Vespa crabro, Wasmannia auropunctata, Xeris* spp.;

from the order of the Isopoda, for example *Armadillidium vulgare, Oniscus asellus, Porcellio scaber;* from the order of the Isoptera, for example *Coptotermes* spp., for example *Coptotermes formosanus, Cornitermes cumulans, Cryptotermes* spp., *Incisitermes* spp., *Kalotermes* spp., *Microtermes obesi, Nasutitermes* spp., *Odontotermes* spp., *Porotermes* spp., *Reticulitermes* spp., for example *Reticulitermes flavipes, Reticulitermes hesperus;* from the order of the Lepidoptera, for example *Achroia grisella, Acronicta major, Adoxophyes* spp., for example *Adoxophyes orana, Aedia leucomelas, Agrotis* spp., for example *Agrotis segetum, Agrotis ipsilon, Alabama* spp., for example *Alabama argillacea, Amyelois transitella, Anarsia* spp., *Anticarsia* spp., for example *Anticarsia gemmatalis, Argyroploce* spp., *Autographa* spp., *Barathra brassicae, Blastodacna atra, Borbo cinnara, Bucculatrix thurberiella, Bupalus piniarius, Busseola* spp., *Cacoecia* spp., *Caloptilia theivora, Capua reticulana, Carpocapsa pomonella, Carposina niponensis, Cheimatobia brumata, Chilo* spp., for example *Chilo plejadellus, Chilo suppressalis, Choreutis pariana, Choristoneura* spp., *Chrysodeixis chalcites, Clysia ambiguella, Cnaphalocerus* spp., *Cnaphalocrocis medinalis, Cnephasia* spp., *Conopomorpha* spp., *Conotrachelus* spp., *Copitarsia* spp., *Cydia* spp., for example *Cydia nigricana, Cydia pomonella, Dalaca noctuides, Diaphania* spp., *Diparopsis* spp., *Diatraea saccharalis, Dioryctria* spp., for example *Dioryctria zimmermani, Earias* spp., *Ecdytolopha aurantium, Elasmopalpus lignosellus, Eldana saccharina, Ephestia* spp., for example *Ephestia elutella, Ephestia kuehniella, Epinotia* spp., *Epiphyas postvittana, Erannis* spp., *Erschoviella musculana, Etiella* spp., *Eudocima* spp., *Eulia* spp., *Eupoecilia ambiguella, Euproctis* spp., for example *Euproctis chrysorrhoea, Euxoa* spp., *Feltia* spp., *Galleria mellonella, Gracillaria* spp., *Grapholitha* spp., for example *Grapholita molesta, Grapholita prunivora, Hedylepta* spp., *Helicoverpa* spp., for example *Helicoverpa armigera, Helicoverpa zea, Heliothis* spp., for example *Heliothis virescens, Hofmannophila pseudospretella, Homoeosoma* spp., *Homona* spp., *Hyponomeuta padella, Kakivoria flavofasciata, Lampides* spp., *Laphygma* spp., *Laspeyresia molesta, Leucinodes orbonalis, Leucoptera* spp., for example *Leucoptera coffeella, Lithocolletis* spp., for example *Lithocolletis blancardella, Lithophane antennata, Lobesia* spp., for example *Lobesia botrana, Loxagrotis albicosta, Lymantria* spp., for example *Lymantria dispar, Lyonetia* spp., for example *Lyonetia clerkella, Malacosoma neustria, Maruca testulalis, Mamestra brassicae, Melanitis leda, Mocis* spp., *Monopis obviella, Mythimna separata, Nemapogon cloacellus, Nymphula* spp., *Oiketicus* spp., *Omphisa* spp., *Operophtera* spp., *Oria* spp., *Orthaga* spp., *Ostrinia* spp., for example *Ostrinia nubilalis, Panolis flammea, Parnara* spp., *Pectinophora* spp., for example *Pectinophora gossypiella, Perileucoptera* spp., *Phthorimaea* spp., for example *Phthorimaea operculella, Phyllocnistis citrella, Phyllonorycter* spp., for example *Phyllonorycter blancardella, Phyllonorycter crataegella, Pieris* spp., for example *Pieris rapae, Platynota stultana, Plodia interpunctella, Plusia* spp., *Plutella xylostella (=Plutella maculipennis), Podesia* spp., for example *Podesia syringae, Prays* spp., *Prodenia* spp., *Protoparce* spp., *Pseudaletia* spp., for example *Pseudaletia unipuncta, Pseudoplusia includens, Pyrausta nubilalis, Rachiplusia nu, Schoenobius* spp., for example *Schoenobius bipunctifer, Scirpophaga* spp., for example *Scirpophaga innotata, Scotia segetum, Sesamia* spp., for example *Sesamia inferens, Sparganothis* spp., *Spodoptera* spp., for example *Spodoptera eradiana, Spodoptera exigua, Spodoptera frugiperda, Spodoptera praefica, Stathmopoda* spp., *Stenoma* spp., *Stomopteryx subsecivella, Synanthedon* spp., *Tecia solanivora, Thaumetopoea* spp., *Thermesia gemmatalis, Tinea cloacella, Tinea pellionella, Tineola bisselliella, Tortrix* spp., *Trichophaga tapetzella, Trichoplusia* spp., for example *Trichoplusia ni, Tryporyza incertulas, Tuta absoluta, Virachola* spp.;

from the order of the Orthoptera or Saltatoria, for example *Acheta domesticus, Dichroplus* spp., *Gryllotalpa* spp., for example *Gryllotalpa gryllotalpa, Hieroglyphus* spp., *Locusta* spp., for example *Locusta migratoria, Melanoplus* spp., for example *Melanoplus devastator, Paratlanticus ussuriensis, Schistocerca gregaria;* from the order of the Phthiraptera, for example *Damalinia* spp., *Haematopinus* spp., *Linognathus* spp., *Pediculus* spp., *Phylloxera vastatrix, Phthirus pubis, Trichodectes* spp.;

from the order of the Psocoptera, for example *Lepinotus* spp., *Liposcelis* spp.;

from the order of the Siphonaptera, for example, *Ceratophyllus* spp., *Ctenocephalides* spp., for example *Ctenocephalides canis, Ctenocephalides felis, Pulex irritans, Tunga penetrans, Xenopsylla cheopis;* from the order of the Thysanoptera, for example *Anaphothrips obscurus, Baliothrips biformis, Chaetanaphothrips leeuweni, Drepanothrips reuteri, Enneothrips flavens, Frankliniella* spp., for example *Frankliniella fusca, Frankliniella occidentalis, Frankliniella schultzei, Frankliniella tritici, Frankliniella vaccinii, Frankliniella williamsi, Haplothrips* spp., *Heliothrips* spp., *Hercinothrips femoralis, Kakothrips* spp., *Rhipiphorothrips cruentatus, Scirtothrips* spp., *Taeniothrips cardamomi, Thrips* spp., for example *Thrips palmi, Thrips tabaci;* from the order of the Zygentoma (=*Thysanura*), for example *Ctenolepisma* spp., *Lepisma saccharina, Lepismodes inquilinus, Thermobia domestica;* from the class of the Symphyla, for example *Scutigerella* spp., for example *Scutigerella immaculata;* pests from the phylum of the Mollusca, for example from the class of the Bivalvia, for example *Dreissena* spp., and also from the class of the Gastropoda, for example *Anion* spp., for example *Anion ater rufus, Biomphalaria* spp., *Bulinus* spp., *Deroceras* spp., for example *Deroceras laeve, Galba* spp., *Lymnaea* spp., *Oncomelania* spp., *Pomacea* spp., *Succinea* spp.;

plant pests from the phylum of the Nematoda, i.e. phytoparasitic nematodes, in particular *Aglenchus* spp., for example *Aglenchus agricola, Anguina* spp., for example *Anguina tritici, Aphelenchoides* spp., for example *Aphelenchoides arachidis, Aphelenchoides fragariae, Belonolaimus* spp., for example *Belonolaimus gracilis, Belonolaimus longicaudatus, Belonolaimus nortoni, Bursaphelenchus* spp., for example *Bursaphelenchus cocophilus, Bursaphelenchus eremus, Bursaphelenchus xylophilus, Cacopaurus* spp., for example *Cacopaurus pestis, Criconemella* spp., for example *Criconemella curvata, Criconemella onoensis, Criconemella ornata, Criconemella rusium, Criconemella xenoplax (=Mesocriconema xenoplax), Criconemoides* spp., for example *Criconemoides ferniae, Criconemoides onoense, Criconemoides ornatum, Ditylenchus* spp., for example *Ditylenchus dipsaci, Dolichodorus* spp., *Globodera* spp., for example *Globodera pallida, Globodera rostochiensis, Helicotylenchus* spp., for example *Helicotylenchus dihystera, Hemicriconemoides* spp., *Hemicycliophora* spp., *Heterodera* spp., for example *Heterodera avenae, Heterodera glycines, Heterodera schachtii, Hirschmaniella* spp., *Hoplolaimus* spp., *Longidorus* spp., for example *Longidorus africanus, Meloidogyne* spp., for example *Meloidogyne chitwoodi, Meloidogyne fallax, Meloidogyne hapla, Meloidogyne incognita, Meloinema* spp., *Nacobbus* spp., *Neotylenchus* spp., *Paralongidorus* spp., *Paraphelenchus* spp., *Paratrichodorus* spp., for example *Paratrichodorus minor, Paratylenchus* spp., *Pratylenchus* spp., for example *Pratylenchus penetrans, Pseudohalenchus* spp., *Psilenchus* spp., *Punctodera* spp., *Quinisulcius* spp., *Radopholus* spp., for example *Radopholus citrophilus, Radopholus similis, Rotylenchulus* spp., *Rotylenchus* spp., *Scutellonema* spp., *Subanguina* spp., *Trichodorus* spp., for example *Trichodorus obtusus, Trichodorus primitivus, Tylenchorhynchus* spp., for example *Tylenchorhynchus annulatus, Tylenchulus* spp., for example *Tylenchulus semipenetrans, Xiphinema* spp., for example *Xiphinema index.*

Formulations

The present invention further relates to formulations and use forms prepared therefrom as pesticides, for example drench, drip and spray liquors, comprising an active compound combination according to the invention. In some cases, the use forms comprise further pesticides and/or adjuvants which improve action, such as penetrants, e.g. vegetable oils, for example rapeseed oil, sunflower oil, mineral oils, for example paraffin oils, alkyl esters of vegetable fatty acids, for example rapeseed oil methyl ester or soya oil methyl ester, or alkanol alkoxylates and/or spreaders, for example alkylsiloxanes and/or salts, for example organic or inorganic ammonium or phosphonium salts, for example ammonium sulphate or diammonium hydrogenphosphate and/or retention promoters, for example dioctyl sulphosuccinate or hydroxypropyl guar polymers and/or humectants, for example glycerol and/or fertilizers, for example ammonium-, potassium- or phosphorus-containing fertilizers.

Customary formulations are, for example, water-soluble liquids (SL), emulsion concentrates (EC), emulsions in water (EW), suspension concentrates (SC, SE, FS, OD), water-dispersible granules (WG), granules (GR) and capsule concentrates (CS); these and further possible formulation types are described, for example, by Crop Life International and in Pesticide Specifications, Manual on development and use of FAO and WHO specifications for pesticides, FAO Plant Production and Protection Papers—173, prepared by the FAO/WHO Joint Meeting on Pesticide Specifications, 2004, ISBN: 9251048576. The formulations, in addition to the active compound combination according to the invention, optionally comprise further agrochemically active compounds.

These are preferably formulations or use forms which comprise auxiliaries, for example extenders, solvents, spontaneity promoters, carriers, emulsifiers, dispersants, frost protectants, biocides, thickeners and/or further auxiliaries, for example adjuvants. An adjuvant in this context is a component which enhances the biological effect of the formulation, without the component itself having any biological effect. Examples of adjuvants are agents which promote retention, spreading, attachment to the leaf surface or penetration.

These formulations are prepared in a known way, for example by mixing the active compound combination according to the invention with auxiliaries such as, for example, extenders, solvents and/or solid carriers and/or other auxiliaries such as, for example, surfactants. The formulations are prepared either in suitable facilities or else before or during application.

The auxiliaries used may be substances suitable for imparting special properties, such as certain physical, technical and/or biological properties, to the formulation of the active compound combination according to the invention, or to the use forms prepared from these formulations (for example ready-to-use pesticides such as spray liquors or seed dressing products).

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), the esters (including fats and oils) and (poly)ethers, the unsubstituted and substituted amines, amides, lactams (such as N-alkylpyrrolidones) and lactones, the sulphones and sulphoxides (such as dimethyl sulphoxide), the carbonates and the nitriles.

If the extender used is water, it is also possible to employ, for example, organic solvents as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide or dimethyl sulphoxide, carbonates such as propylene carbonate, butylene carbonate, diethyl carbonate or dibutyl carbonate, or nitriles such as acetonitrile or propanenitrile.

In principle, it is possible to use all suitable solvents. Examples of suitable solvents are aromatic hydrocarbons, such as xylene, toluene or alkylnaphthalenes, chlorinated aromatic or chlorinated aliphatic hydrocarbons, such as chlorobenzene, chloroethylene or methylene chloride, aliphatic hydrocarbons, such as cyclohexane, paraffins, petroleum fractions, mineral and vegetable oils, alcohols, such as methanol, ethanol, isopropanol, butanol or glycol and their ethers and esters, ketones such as acetone, methyl ethyl ketone, methyl isobutyl ketone or cyclohexanone, strongly polar solvents, such as dimethyl sulphoxide, carbonates such as propylene carbonate, butylene carbonate, diethyl carbonate or dibutyl carbonate, nitriles such as acetonitrile or propanenitrile, and also water.

In principle, it is possible to use all suitable carriers. Useful carriers include especially: for example ammonium salts and ground natural minerals such as kaolins, clays, talc, chalk, quartz, attapulgite, montmorillonite or diatomaceous earth, and ground synthetic materials such as finely divided silica, alumina and natural or synthetic silicates, resins, waxes and/or solid fertilizers. Mixtures of such carriers can likewise be used. Useful carriers for granules include: for example crushed and fractionated natural rocks such as calcite, marble, pumice, sepiolite, dolomite, and synthetic granules of inorganic and organic meals, and also granules of organic material such as sawdust, paper, coconut shells, corn cobs and tobacco stalks.

Liquefied gaseous extenders or solvents can also be used. Particularly suitable extenders or carriers are those which are gaseous at ambient temperature and under atmospheric pressure, for example aerosol propellant gases, such as halohydrocarbons, and also butane, propane, nitrogen and carbon dioxide.

Examples of emulsifiers and/or foam-formers, dispersants or wetting agents with ionic or nonionic properties, or mixtures of these surfactants, are salts of polyacrylic acid, salts of lignosulphonic acid, salts of phenolsulphonic acid or naphthalenesulphonic acid, polycondensates of ethylene oxide with fatty alcohols or with fatty acids or with fatty amines, with substituted phenols (preferably alkylphenols or arylphenols), salts of sulphosuccinic esters, taurine derivatives (preferably alkyl taurates), isethionate derivatives, phosphoric esters of polyethoxylated alcohols or phenols, fatty esters of polyols, and derivatives of the compounds containing sulphates, sulphonates and phosphates, for example alkylaryl polyglycol ethers, alkylsulphonates, alkyl sulphates, arylsulphonates, protein hydrolysates, lignosulphite waste liquors and methylcellulose. The presence of a surfactant is advantageous if at least one of the compounds of the active compound combination according to the invention and/or one of the inert carriers is insoluble in water and when the application takes place in water.

It is possible to use colorants such as inorganic pigments, for example iron oxide, titanium oxide and Prussian Blue, and organic dyes such as alizarin dyes, azo dyes and metal phthalocyanine dyes, and nutrients and trace nutrients such as salts of iron, manganese, boron, copper, cobalt, molybdenum and zinc as further auxiliaries in the formulations and the use forms derived therefrom.

Additional components may be stabilizers, such as lowtemperature stabilizers, preservatives, antioxidants, light stabilizers or other agents which improve chemical and/or physical stability. Foam formers or antifoams may also be present.

Tackifiers such as carboxymethylcellulose and natural and synthetic polymers in the form of powders, granules or latices, such as gum arabic, polyvinyl alcohol and polyvinyl acetate, or else natural phospholipids such as cephalins and lecithins and synthetic phospholipids may also be present as additional auxiliaries in the formulations and the use forms derived therefrom. Further possible auxiliaries are mineral and vegetable oils.

Optionally, further auxiliaries may be present in the formulations and the use forms derived therefrom. Examples of such additives include fragrances, protective colloids, binders, adhesives, thickeners, thixotropic agents, penetrants, retention promoters, stabilizers, sequestrants, complexing agents, humectants, spreaders. In general, the active compound combination according to the invention can be combined with any solid or liquid additive commonly used for formulation purposes.

Useful retention promoters include all those substances which reduce the dynamic surface tension, for example dioctyl sulphosuccinate, or increase the viscoelasticity, for example hydroxypropylguar polymers.

Suitable penetrants in the present context are all those substances which are usually used for improving the penetration of agrochemical active compounds into plants. Penetrants are defined in this context by their ability to penetrate from the (generally aqueous) application liquor and/or from the spray coating into the cuticle of the plant and thereby increase the mobility of active compounds in the cuticle. The method described in the literature (Baur et al., 1997, Pesticide Science 51, 131-152) can be used to determine this property. Examples include alcohol alkoxylates such as coconut fatty ethoxylate (10) or isotridecyl ethoxylate (12), fatty acid esters, for example rapeseed oil methyl ester or soya oil methyl ester, fatty amine alkoxylates, for example tallowamine ethoxylate (15), or ammonium and/or phosphonium salts, for example ammonium sulphate or diammonium hydrogenphosphate.

The formulations preferably comprise between 0.00000001 and 98% by weight of the active compound combination according to the invention or, with particular preference, between 0.01% and 95% by weight of the active compound combination according to the invention, more preferably between 0.5% and 90% by weight of the active compound combination according to the invention, based on the weight of the formulation.

The content of the compound of the active compound combination according to the invention in the use forms prepared from the formulations (in particular pesticides) may vary within wide ranges. The concentration of the active compound combination according to the invention in the use forms is usually between 0.00000001 and 95% by weight of the active compound combination according to the invention, preferably between 0.00001 and 1% by weight, based on the weight of the use form. The compounds are employed in a customary manner appropriate for the use forms.

Plants and Plant Parts

All plants and plant parts can be treated in accordance with the invention. Here, plants are to be understood to mean all plants and plant parts such as wanted and unwanted wild plants or crop plants (including naturally occurring crop plants), for example cereals (wheat, rice, triticale, barley, rye, oats), maize, soya bean, potato, sugar beet, sugar cane, tomatoes, pepper, cucumber, melon, carrot, watermelon, onion, lettuce, spinach, leek, beans, *Brassica oleracea* (e.g. cabbage) and other vegetable species, cotton, tobacco, oilseed rape, and also fruit plants (with the fruits apples, pears, citrus fruits and grapevines). Crop plants can be plants which can be obtained by conventional breeding and optimization methods or by biotechnological and genetic engineering methods or combinations of these methods, including the transgenic plants and including the plant varieties which can or cannot be protected by varietal property rights. Plants should be understood to mean all developmental stages, such as seeds, seedlings, young (immature) plants up to mature plants. Plant parts should be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Parts of plants also include harvested plants or harvested plant parts and vegetative and generative propagation material, for example seedlings, tubers, rhizomes, cuttings and seeds.

Treatment according to the invention of the plants and plant parts with the active compound combination according to the invention is carried out directly or by allowing the compounds to act on the surroundings, environment or storage space by the customary treatment methods, for example by immersion, spraying, evaporation, fogging, scattering, painting on, injection and, in the case of propagation material, in particular in the case of seeds, also by applying one or more coats.

As already mentioned above, it is possible to treat all plants and their parts according to the invention. In a preferred embodiment, wild plant species and plant cultivars, or those obtained by conventional biological breeding methods, such as crossing or protoplast fusion, and also parts thereof, are treated. In a further preferred embodiment, transgenic plants and plant cultivars obtained by genetic engineering methods, if appropriate in combination with conventional methods (genetically modified organisms), and parts thereof are treated. The term "parts" or "parts of plants" or "plant parts" has been explained above. The invention is used with particular preference to treat plants of the respective commercially customary cultivars or those that are in use. Plant cultivars are to be understood as meaning plants having new properties ("traits") and which have been obtained by conventional breeding, by mutagenesis or by recombinant DNA techniques. They can be cultivars, varieties, bio- or genotypes.

Transgenic Plant, Seed Treatment and Integration Events

The transgenic plants or plant cultivars (those obtained by genetic engineering) which are to be treated with preference in accordance with the invention include all plants which, through the genetic modification, received genetic material which imparts particular advantageous useful properties ("traits") to these plants. Examples of such properties are better plant growth, increased tolerance to high or low temperatures, increased tolerance to drought or to levels of water or soil salinity, enhanced flowering performance, easier harvesting, accelerated ripening, higher yields, higher quality and/or a higher nutritional value of the harvested products, better storage life and/or processability of the harvested products. Further and particularly emphasized examples of such properties are increased resistance of the plants against animal and microbial pests, such as against insects, arachnids, nematodes, mites, slugs and snails owing, for example, to toxins formed in the plants, in particular those formed in the plants by the genetic material from *Bacillus thuringiensis* (for example by the genes CryIA(a), CryIA(b), CryIA(c), CryIIA, CryIIIA, CryIIIB2, Cry9c Cry2Ab, Cry3Bb and CryIF and also combinations thereof), furthermore increased resistance of the plants against phytopathogenic fungi, bacteria and/or viruses owing, for example, to systemic acquired resistance (SAR), systemin, phytoalexins, elicitors and also resistance genes and correspondingly expressed proteins and toxins, and also increased tolerance of the plants to certain herbicidally active compounds, for example imidazolinones, sulphonylureas, glyphosate or phosphinothricin (for example the "PAT" gene). The genes which impart the desired traits in question may also be present in combinations with one another in the transgenic plants. Examples of transgenic plants which may be mentioned are the important crop plants, such as cereals (wheat, rice, triticale, barley, rye, oats), maize, soya beans, potatoes, sugar beet, sugar cane, tomatoes, peas and other types of vegetable, cotton, tobacco, oilseed rape and also fruit plants (with the fruits apples, pears, citrus fruits and grapes), with particular emphasis being given to maize, soya beans, wheat, rice, potatoes, cotton, sugar cane, tobacco and oilseed rape. Traits which are particularly emphasized are the increased resistance of the plants to insects, arachnids, nematodes and slugs and snails.

Crop Protection Types of Treatment

The treatment of the plants and plant parts with the compounds of the active compound combination according to the invention is carried out directly or by action on their surroundings, habitat or storage space using customary treatment methods, for example by dipping, spraying, atomizing, irrigating, evaporating, dusting, fogging, broadcasting, foaming, painting, spreading-on, injecting, watering (drenching), drip irrigating and, in the case of propagation material, in particular in the case of seed, furthermore as a powder for dry seed treatment, a solution for liquid seed treatment, a water-soluble powder for slurry treatment, by incrusting, by coating with one or more coats, etc. It is furthermore possible to apply the active compound combination according to the invention by the ultra-low volume method or to inject the application form or the active compound combination according to the invention itself into the soil.

A preferred direct treatment of the plants is foliar application, i.e. the active compound combination according to the invention is applied to the foliage, where treatment frequency and the application rate should be adjusted according to the level of infestation with the pest in question.

In the case of systemically active compounds, the active compound combination according to the invention also access the plants via the root system. The plants are then treated by the action of the active compound combination according to the invention on the habitat of the plant. This may be done, for example, by drenching, or by mixing into the soil or the nutrient solution, i.e. the locus of the plant (e.g. soil or hydroponic systems) is impregnated with a liquid form of the active compound combination according to the invention, or by soil application, i.e. the active compound combination according to the invention is introduced in solid form (e.g. in the form of granules) into the locus of the plants, or by drip application (often also referred to as "chemigation"), i.e. the liquid application of the active compound combination according to the invention from surface or sub-surface driplines over a certain period of time together with varying amounts of water at defined locations in the vicinity of the plants. In the case of paddy rice crops, this can also be done by metering the active compound combination according to the invention in a solid application form (for example as granules) into a flooded paddy field.

Treatment of Seed

The control of animal pests by treating the seed of plants has been known for a long time and is the subject of continuous improvements. However, the treatment of seed entails a series of problems which cannot always be solved in a satisfactory manner. Thus, it is desirable to develop methods for protecting the seed and the germinating plant which dispense with, or at least reduce considerably, the additional application of pesticides during storage, after sowing or after emergence of the plants. It is furthermore desirable to optimize the amount of active compound employed in such a way as to provide optimum protection for the seed and the germinating plant from attack by animal pests, but without damaging the plant itself by the active compound employed. In particular, methods for the treatment of seed should also take into consideration the intrinsic insecticidal or nematicidal properties of pest-resistant or -tolerant transgenic plants in order to achieve optimum protection of the seed and also the germinating plant with a minimum of pesticides being employed.

The present invention therefore in particular also relates to a method for the protection of seed and germinating plants, from attack by pests, by treating the seed with an active compound combination according to the invention. The method according to the invention for protecting seed and germinating plants against attack by pests furthermore comprises a method where the seed is treated simultaneously in one operation or sequentially with the compound of formula (I) and the mixing partner of group (II). It also comprises a method where the seed is treated at different times with the compound of formula (I) and the mixing partner of group (II).

The invention likewise relates to the use of the active compound combination according to the invention for the treatment of seed for protecting the seed and the resulting plant from animal pests.

Furthermore, the invention relates to seed which has been treated with an active compound combination according to the invention so as to afford protection from animal pests. The invention also relates to seed which has been treated simultaneously with an active compound combination according to the invention. The invention furthermore relates to seed which has been treated at different times with the compound of formula (I) and the mixing partner of group (II). In the case of seed which has been treated at different points in time with an active compound combination according to the invention, the individual substances may be present on the seed in different layers. Here, the layers comprising a compound of the formula (I) and a mixing partner of group (II) may optionally be separated by an intermediate layer. The invention also relates to seed where a compound of the formula (I) and a mixing partner of group (II) have been applied as component of a coating or as a further layer or further layers in addition to a coating.

Furthermore, the invention relates to seed which, after the treatment with an active compound combination according to the invention, is subjected to a film-coating process to prevent dust abrasion on the seed.

One of the advantages encountered with a systemically acting active compound combination according to the invention is the fact that, by treating the seed, not only the seed itself but also the plants resulting therefrom are, after emergence, protected against animal pests. In this manner, the immediate treatment of the crop at the time of sowing or shortly thereafter can be dispensed with.

It has to be considered a further advantage that by treatment of the seed with an active compound combination according to the invention, germination and emergence of the treated seed may be enhanced.

It is likewise to be considered advantageous that an active compound combination according to the invention can be used in particular also for transgenic seed.

Furthermore, active compound combinations according to the invention can be employed in combination with compositions or compounds of signalling technology, leading to better colonization by symbionts such as, for example, rhizobia, mycorrhizae and/or endophytic bacteria or fungi, and/or to optimized nitrogen fixation.

The active compound combinations according to the invention are suitable for protection of seed of any plant variety which is used in agriculture, in the greenhouse, in forests or in horticulture. In particular, this takes the form of seed of cereals (for example wheat, barley, rye, millet and oats), corn, cotton, soya beans, rice, potatoes, sunflowers, coffee, tobacco, canola, oilseed rape, beets (for example sugarbeets and fodder beets), peanuts, vegetables (for example tomatoes, cucumbers, bean, cruciferous vegetables, onions and lettuce), fruit plants, lawns and ornamental plants. The treatment of the seed of cereals (such as wheat, barley, rye and oats), maize, soya beans, cotton, canola, oilseed rape, vegetables and rice is of particular importance.

As already mentioned above, the treatment of transgenic seed with an active compound combination according to the invention is also of particular importance. This takes the form of seed of plants which, as a rule, comprise at least one heterologous gene which governs the expression of a polypeptide with in particular insecticidal and/or nematicidal properties. The heterologous genes in transgenic seed can originate from microorganisms such as *Bacillus, Rhizobium, Pseudomonas, Serratia, Trichoderma, Clavibacter, Glomus* or *Gliocladium*. The present invention is particularly suitable for the treatment of transgenic seed which comprises at least one heterologous gene originating from *Bacillus* sp. It is particularly preferably a heterologous gene derived from *Bacillus thuringiensis*.

In the context of the present invention, the active compound combination according to the invention is applied to the seed. Preferably, the seed is treated in a state in which it is stable enough to avoid damage during treatment. In general, the seed may be treated at any point in time between harvest and sowing. The seed usually used has been separated from the plant and freed from cobs, shells, stalks, coats, hairs or the flesh of the fruits. For example, it is possible to use seed which has been harvested, cleaned and dried down to a moisture content which allows storage. Alternatively, it is also possible to use seed which, after drying, has been treated with, for example, water and then dried again, for example priming. In the case of rice seed, it is also possible to use seed which has been soaked, for example in water to a certain stage of the rice embryo ('pigeon breast stage'), stimulating the germination and a more uniform emergence.

When treating the seed, care must generally be taken that the amount of the active compound combination according to the invention applied to the seed and/or the amount of further additives is chosen in such a way that the germination of the seed is not adversely affected, or that the resulting plant is not damaged. This must be ensured particularly in the case of active compounds which can exhibit phytotoxic effects at certain application rates.

In general, the active compound combinations according to the invention are applied to the seed in a suitable formulation. Suitable formulations and processes for seed treatment are known to the person skilled in the art.

The active compound combinations according to the invention can be converted to the customary seed dressing formulations, such as solutions, emulsions, suspensions, powders, foams, slurries or other coating compositions for seed, and also ULV formulations.

These formulations are prepared in a known manner, by mixing the active compound combinations according to the invention with customary additives such as, for example, customary extenders and also solvents or diluents, colorants, wetting agents, dispersants, emulsifiers, antifoams, preservatives, secondary thickeners, adhesives, gibberellins and also water.

Colorants which may be present in the seed-dressing formulations which can be used in accordance with the invention are all colorants which are customary for such purposes. It is possible to use either pigments, which are sparingly soluble in water, or dyes, which are soluble in water. Examples include the dyes known by the names Rhodamine B, C.I. Pigment Red 112 and C.I. Solvent Red 1.

Useful wetting agents which may be present in the seed dressing formulations usable in accordance with the invention are all substances which promote wetting and which are conventionally used for the formulation of agrochemically active compounds. Preference is given to using alkylnaphthalenesulphonates, such as diisopropyl- or diisobutylnaphthalenesulphonates.

Useful dispersants and/or emulsifiers which may be present in the seed dressing formulations usable in accordance with the invention are all nonionic, anionic and cationic dispersants conventionally used for the formulation of active agrochemical ingredients. Preference is given to using nonionic or anionic dispersants or mixtures of nonionic or anionic dispersants. Suitable nonionic dispersants include in particular ethylene oxide/propylene oxide block polymers, alkylphenol polyglycol ethers and tristryrylphenol polyglycol ethers, and the phosphated or sulphated derivatives thereof. Suitable anionic dispersants are in particular lignosulphonates, polyacrylic acid salts and arylsulphonate/formaldehyde condensates.

Antifoams which may be present in the seed dressing formulations usable in accordance with the invention are all foam-inhibiting substances conventionally used for the formulation of active agrochemical ingredients. Preference is given to using silicone antifoams and magnesium stearate.

Preservatives which may be present in the seed dressing formulations usable in accordance with the invention are all substances usable for such purposes in agrochemical compositions. Examples include dichlorophene and benzyl alcohol hemiformal.

Secondary thickeners which may be present in the seed dressing formulations usable in accordance with the invention are all substances which can be used for such purposes in agrochemical compositions. Cellulose derivatives, acrylic acid derivatives, xanthan, modified clays and finely divided silica are preferred.

Adhesives which may be present in the seed dressing formulations usable in accordance with the invention are all customary binders usable in seed dressing products. Polyvinylpyrrolidone, polyvinyl acetate, polyvinyl alcohol and tylose may be mentioned as being preferred.

Gibberellins which can be present in the seed-dressing formulations which can be used in accordance with the invention are preferably the gibberellins A1, A3 (=gibberellic acid), A4 and A7; gibberellic acid is especially preferably used. The gibberellins are known (cf. R. Wegler "Chemie der Pflanzenschutz- and Schädlingsbekämpfungsmittel", vol. 2, Springer Verlag, 1970, pp. 401-412).

The seed dressing formulations usable in accordance with the invention can be used to treat a wide variety of different kinds of seed either directly or after prior dilution with water. For instance, the concentrates or the preparations obtainable therefrom by dilution with water can be used to dress the seed of cereals, such as wheat, barley, rye, oats, and triticale, and also the seed of maize, rice, oilseed rape, peas, beans, cotton, sunflowers, soya beans and beets, or else a wide variety of different vegetable seed. The seed dressing formulations usable in accordance with the invention, or the dilute use forms thereof, can also be used to dress seed of transgenic plants.

For treatment of seed with the seed dressing formulations usable in accordance with the invention, or the use forms prepared therefrom by adding water, all mixing units usable customarily for the seed dressing are useful. Specifically, the procedure in the seed dressing is to place the seed into a mixer, operated batch-wise or continuously, to add the particular desired amount of seed dressing formulations, either as such or after prior dilution with water, and to mix everything until the formulation is distributed homogeneously on the seed. If appropriate, this is followed by a drying operation.

The application rate of the seed dressing formulations usable in accordance with the invention can be varied within a relatively wide range. It is guided by the particular content of the active compound combinations according to the invention in the formulations and by the seed. The application rates of the active compound combinations according to the invention are generally between 0.001 and 50 g per kilogram of seed, preferably between 0.01 and 15 g per kilogram of seed.

Vector Control

The active compound combinations according to the invention can also be used in vector control. For the purpose of the present invention, a vector is an arthropod, in particular an insect or arachnid, capable of transmitting pathogens such as, for example, viruses, worms, single-cell organisms and bacteria from a reservoir (plant, animal, human, etc.) to a host. The pathogens can be transmitted either mechanically (for example trachoma by non-stinging flies) to a host, or by injection (for example malaria parasites by mosquitoes) into a host.

Examples of vectors and the diseases or pathogens they transmit are:

1) Mosquitoes

*Anopheles*: malaria, filariasis;

*Culex*: Japanese encephalitis, other viral diseases, filariasis, transmission of other worms;

*Aedes*: yellow fever, dengue fever, other viral diseases, filariasis;

Simuliidae: transmission of worms, in particular *Onchocerca volvulus;*

Psychodidae: transmission of leishmaniasis

2) Lice: skin infections, epidemic typhus;

3) Fleas: plague, endemic typhus, cestodes;

4) Flies: sleeping sickness (trypanosomiasis); cholera, other bacterial diseases;

5) Mites: acariosis, epidemic typhus, rickettsialpox, tularaemia, Saint Louis encephalitis, tick-borne encephalitis (TBE), Crimean-Congo haemorrhagic fever, borreliosis;

6) Ticks: borellioses such as *Borrelia burgdorferi* sensu lato., *Borrelia duttoni*, tick-borne encephalitis, Q fever (*Coxiella burnetii*), babesioses (*Babesia canis canis*), ehrlichiosis.

Examples of vectors in the sense of the present invention are insects, for example aphids, flies, leafhoppers or thrips, which are capable of transmitting plant viruses to plants. Other vectors capable of transmitting plant viruses are spider mites, lice, beetles and nematodes.

Further examples of vectors in the sense of the present invention are insects and arachnids such as mosquitoes, in particular of the genera *Aedes*, *Anopheles*, for example *A. gambiae, A. arabiensis, A. funestus, A. dirus* (malaria) and *Culex*, psychodids such as *Phlebotomus, Lutzomyia*, lice, fleas, flies, mites and ticks capable of transmitting pathogens to animals and/or humans.

Vector control is also possible if the active compound combinations according to the invention are resistance-breaking.

Active compound combinations according to the invention are suitable for use in the prevention of diseases and/or pathogens transmitted by vectors. Thus, a further aspect of the present invention is the use of active compound combinations according to the invention for vector control, for example in agriculture, in horticulture, in gardens and in leisure facilities, and also in the protection of materials and stored products.

Protection of Industrial Materials

The active compound combinations according to the invention are suitable for protecting industrial materials against attack or destruction by insects, for example from the orders Coleoptera, Hymenoptera, Isoptera, Lepidoptera, Psocoptera and Zygentoma.

Industrial materials in the present context are understood to mean inanimate materials, such as preferably plastics, adhesives, sizes, papers and cards, leather, wood, processed wood products and coating compositions. The use of the invention for protecting wood is particularly preferred.

In a further embodiment, the active compound combinations according to the invention are used together with at least one further insecticide and/or at least one fungicide.

In a further embodiment, the active compound combinations according to the invention are present as a ready-to-use pesticide, i.e. they can be applied to the material in question without further modifications. Suitable further insecticides or fungicides are in particular those mentioned above.

Surprisingly, it has also been found that the active compound combinations according to the invention can be employed for protecting objects which come into contact with saltwater or brackish water, in particular hulls, screens, nets, buildings, moorings and signalling systems, against fouling. Likewise, the active compound combinations according to the invention, alone or in combinations with other active compounds, can be used as antifouling agents.

The plants listed can be treated particularly advantageously according to the invention with the active compound combinations according to the invention. The preferred ranges given above in the active compound combinations also apply to the treatment of these plants. Particular emphasis is placed on the plant treatment with the active compound combinations specifically mentioned in the present text.

The good effect of the active compound combinations according to the invention is evident from the following examples. While the individual active substances have weaknesses in effect, the combinations show an effect which goes beyond a simple effect-summation. A synergistic effect is always present when the action of the active compound combinations is greater than the sum of the effects of the individually applied active compounds.

EXAMPLES

Formula for the Efficacy of the Combination of Two Compounds

The expected efficacy of a given combination of two compounds is calculated as follows (see Colby, S. R., "Calculating Synergistic and antagonistic Responses of Herbicide Combinations", Weeds 15, pp. 20-22, 1967):

If

X is the efficacy expressed in % mortality of the untreated control for test compound A at a concentration of m ppm respectively m g/ha, Y is the efficacy expressed in % mortality of the untreated control for test compound B at a concentration of n ppm respectively n g/ha, E is the efficacy expressed in % mortality of the untreated control using the mixture of A and B at m and n ppm respectively m and n g/ha, then is $$E = X + Y - \frac{X \times Y}{100}$$

If the observed insecticidal efficacy of the combination is higher than the one calculated as "E", then the combination of the two compounds is more than additive, i.e. there is a synergistic effect.

Example A

*Myzus persicae* Spray Test

Solvent: 78.0 parts by weight acetone 1.5 parts by weight dimethylformamide

Emulsifier: alkylarylpolyglycol ether

To produce a suitable preparation of active compound, 1 part by weight of active compound is mixed with the stated amount of solvents and is diluted with water, containing an emulsifier concentration of 1000 ppm, to the desired concentration. To produce a suitable preparation of a spore suspension the spores are diluted with emulsifier containing water to the desired concentration. Further test concentrations are prepared by dilution with emulsifier containing water.

Chinese cabbage (*Brassica pekinensis*) leaf disks infected with all instars of the green peach aphid (*Myzus persicae*), are sprayed with a preparation of the active ingredient of the desired concentration.

After the specified period of time, mortality in % is determined. 100% means all aphids have been killed; 0% means none of the aphids have been killed. The mortality values determined thus are recalculated using the Colby-formula (see above).

According to the present application in this test e.g. the following combinations showed a synergistic effect in comparison to the single compounds:

TABLE A

Myzus persicae - spray test

| Active Ingredient | Concentration in g ai/ha | Efficacy in % after 6 days | |
|---|---|---|---|
| Compound (Cpd) of formula (I) | 8 | 0 | |
|  | 2 | 0 | |
| Cyenopyrafen | 2 | 0 | |
|  | 0.5 | 0 | |
|  |  | obs.* | cal.** |
| Cpd of formula (I) + Cyenopyrafen (4:1) (4:1) according to the invention | 8 + 2 | 70 | 0 |
|  | 2 + 0.5 | 70 | 0 |
| Compound (Cpd) of formula (IIa) | 16 | 0 | |
|  |  | obs.* | cal.** |
| Cpd of formula (I) + Cpd of formula (IIa) (1:2) according to the invention | 8 + 16 | 70 | 0 |

*obs. = observed insecticidal efficacy,
**cal. = efficacy calculated with Colby-formula Example B

*Tetranychus urticae*—Spray Test OP-Resistant

Solvent: 78.0 parts by weight acetone 1.5 parts by weight dimethylformamide
Emulsifier: alkylarylpolyglycol ether To produce a suitable preparation of active compound, 1 part by weight of active compound is mixed with the stated amount of solvents and is diluted with water, containing an emulsifier concentration of 1000 ppm, to the desired concentration. To produce a suitable preparation of a spore suspension the spores are diluted with emulsifier containing water to the desired concentration. Further test concentrations are prepared by dilution with emulsifier containing water.

French bean (*Phaseolus vulgaris*) leaf disks infected with all instars of the two spotted spidermite (*Tetranychus urticae*), are sprayed with a preparation of the active ingredient of the desired concentration.

After the specified period of time, mortality in % is determined. 100% means all spider mites have been killed and 0% means none of the spider mites have been killed. The mortality values determined thus are recalculated using the Colby-formula (see above).

According to the present application in this test e.g. the following combinations showed a synergistic effect in comparison to the single compounds:

TABLE B-1

Tetranychus urticae - spray test

| Active Ingredient | Concentration in g ai/ha | Efficacy in % after 2 days | |
|---|---|---|---|
| Cpd of formula (I) | 0.5 | 0 | |
|  | 0.125 | 0 | |
| Abamectin | 0.00125 | 0 | |
|  |  | obs.* | cal.** |
| Cpd of formula (I) + Abamectin (400:1) according to the invention | 0.5 + 0.00125 | 70 | 0 |
| (Cpd) of formula (IIa) | 1 | 0 | |
|  |  | obs.* | cal.** |
| Cpd of formula (I) + Cpd of formula (IIa) (1:2) according to the invention | 0.5 + 1 | 70 | 0 |
| (Cpd) of formula (IIb) | 0.5 | 0 | |
|  |  | obs.* | cal.** |
| Cpd of formula (I) + Cpd of formula (IIb) (1:1) according to the invention | 0.5 + 0.5 | 70 | 0 |
| Cyflumetofen | 0.5 | 0 | |
|  |  | obs.* | cal.** |
| Cpd of formula (I) + Cyflumetofen (1:1) according to the invention | 0.5 + 0.5 | 90 | 0 |
| Emamectin-benzoate | 0.0125 | 0 | |
|  | 0.003125 | 0 | |
|  |  | obs.* | cal.** |
| Cpd of formula (I) + Emamectin-benzoate (40:1) (40:1) according to the invention | 0.5 + 0.0125 | 70 | 0 |
|  | 0.125 + 0.003125 | 70 | 0 |
| Pyflubumide | 0.0125 | 0 | |
|  |  | obs.* | cal.** |
| Cpd of formula (I) + Pyflubumide (10:1) according to the invention | 0.125 + 0.0125 | 70 | 0 |
| Spinosad | 0.125 | 0 | |
|  | 0.03125 | 0 | |
|  |  | obs.* | cal.** |
| Cpd of formula (I) + Spinosad (4:1) according to the invention | 0.5 + 0.125 | 90 | 0 |
|  | 0.125 + 0.03125 | 70 | 0 |
| Spiromesifen | 0.05 | 0 | |
|  |  | obs.* | cal.** |
| Cpd of formula (I) + Spiromesifen (10:1) according to the invention | 0.5 + 0.05 | 90 | 0 |
| Spirotetramat | 0.05 | 0 | |
|  |  | obs.* | cal.** |
| Cpd of formula (I) + Spirotetramat (10:1) according to the invention | 0.5 + 0.05 | 70 | 0 |

TABLE B-2

*Tetranychus urticae* - spray test

| Active Ingredient | Concentration in g ai/ha | Efficacy in % after 6 days | |
|---|---|---|---|
| Cpd of formula (I) | 0.6 | 0 | |
| | 0.5 | 0 | |
| | 0.3 | 0 | |
| | 0.125 | 0 | |
| Abamectin | 0.03 | 70 | |
| | 0.015 | 70 | |
| | | obs.* | cal.** |
| Cpd of formula (I) + Abamectin (20:1) | 0.6 + 0.03 | 100 | 70 |
| (20:1) according to the invention | 0.3 + 0.015 | 100 | 70 |
| Cpd of formula (IIa) | 1 | 0 | |
| | | obs.* | cal.** |
| Cpd of formula (I) + Cpd of formula (IIa) (1:2) according to the invention | 0.5 + 1 | 90 | 0 |
| Cpd of formula (IIb) | 0.5 | 0 | |
| | | obs.* | cal.** |
| Cpd of formula (I) + Cpd of formula (IIb) (1:1) according to the invention | 0.5 + 0.5 | 70 | 0 |
| Cyenopyrafen | 0.125 | 0 | |
| | | obs.* | cal.** |
| Cpd of formula (I) + Cyenopyrafen (4:1) according to the invention | 0.5 + 0.125 | 70 | 0 |
| Cyflumetofen | 0.5 | 0 | |
| | | obs.* | cal.** |
| Cpd of formula (I) + Cyflumetofen (1:1) according to the invention | 0.5 + 0.5 | 90 | 0 |
| Emamectin-benzoate | 0.15 | 0 | |
| | 0.0125 | 0 | |
| | 0.003125 | 0 | |
| | | obs.* | cal.** |
| Cpd of formula (I) + Emamectin-benzoate (4:1) | 0.6 + 0.15 | 90 | 0 |
| (40:1) | 0.5 + 0.0125 | 70 | 0 |
| (40:1) according to the invention | 0.125 + 0.003125 | 70 | 0 |
| Milbemectin | 1.5 | 0 | |
| | 0.75 | 0 | |
| | | obs.* | cal.** |
| Cpd of formula (I) + Milbemectin (1:2.5) | 0.6 + 1.5 | 90 | 0 |
| (1:2.5) according to the invention | 0.3 + 0.75 | 70 | 0 |
| Pyflubumide | 0.6 | 70 | |
| | 0.0125 | 0 | |
| | | obs.* | cal.** |
| Cpd of formula (I) + Pyflubumide (1:1) | 0.6 + 0.6 | 100 | 70 |
| (10:1) according to the invention | 0.125 + 0.0125 | 90 | 0 |
| Spinosad | 0.125 | 0 | |
| | 0.03125 | 0 | |
| | | obs.* | cal.** |
| Cpd of formula (I) + Spinosad (4:1) | 0.5 + 0.125 | 90 | 0 |
| according to the invention | 0.125 + 0.03125 | 70 | 0 |
| Spiromesifen | 0.6 | 0 | |
| | 0.05 | 0 | |
| | | obs.* | cal.** |
| Cpd of formula (I) + Spiromesifen (1:1) | 0.6 + 0.6 | 70 | 0 |
| (10:1) according to the invention | 0.5 + 0.05 | 90 | 0 |
| Spirotetramat | 0.05 | 0 | |
| | | obs.* | cal.** |
| Cpd of formula (I) + Spirotetramat (10:1) according to the invention | 0.5 + 0.05 | 90 | 0 |

*obs. = observed insecticidal efficacy,
**cal. = efficacy calculated with Colby-formula Example C

*Tetranychus urticae* Spray Test; OP-Resistant
Solvent: 7 parts by weight of dimethylformamide
Emulsifier: alkylaryl polyglycol ether To produce a suitable preparation of active compound, 1 part by weight of active compound is mixed with the stated amount of solvent and is diluted with water, containing an emulsifier concentration of 1000 ppm, to the desired concentration. Further test concentrations are prepared by dilution with emulsifier containing water.

Bean plants (*Phaseolus vulgaris*) which are heavily infested with all stages of the two-spotted spider mite (*Tetranychus urticae*) are treated by being sprayed with the preparation of the active compound of the desired concentration.

After the specified period of time mortality in % is determined. 100% means all the spider mites have been killed and 0% means none of the spider mites have been killed. The mortality values determined thus are recalculated using the Colby-formula (see above).

According to the present application in this test e.g. the following combinations showed a synergistic effect in comparison to the single compounds:

TABLE C-1

Tetranychus urticae - spray test

| Active Ingredient | Concentration in ppm | Efficacy in % after 3 days | |
|---|---|---|---|
| Cpd of formula (I) | 0.4 | 0 | |
| Abamectin | 0.01 | 0 | |
|  |  | obs.* | cal.** |
| Cpd of formula (I) + Abamectin (40:1) according to the invention | 0.4 + 0.01 | 40 | 0 |

TABLE C-2

Tetranychus urticae - spray test

| Active Ingredient | Concentration in ppm | Efficacy in % after 7 days | |
|---|---|---|---|
| Cpd of formula (I) | 0.8 | 30 | |
| Spirotetramat | 2 | 40 | |
|  |  | obs.* | cal.** |
| Cpd of formula (I) + Spirotetramat (1:2.5) according to the invention | 0.8 + 2 | 90 | 58 |

*obs. = observed insecticidal efficacy,
**cal. = efficacy calculated with Colby-formula Example D Meloidogyne incognita—Test Solvent: 125.0 parts by weight of acetone To produce a suitable preparation of active compound, 1 part by weight of active compound is mixed with the stated amount of solvent, and the concentrate is diluted with water to the desired concentration. To produce a suitable preparation of a spore suspension the spores are diluted with water to the desired concentration.

Vessels are filled with sand, a solution of the active ingredient, a suspension containing eggs and larvae of the southern root-knot nematode (Meloidogyne incognita) and salad seeds. The salad seeds germinate and the seedlings grow. Galls develop in the roots.

After the specified period of time nematicidal activity is determined on the basis of the percentage of gall formation. 100% means no galls were found and 0% means the number of galls found on the roots of the treated plants was equal to that in untreated control plants.

According to the present application in this test e.g. the following combinations showed a synergistic effect in comparison to the single compounds:

TABLE D

Meloidogyne incognita - test

| Active Ingredient | Concentration in ppm | Efficacy in % after 14 days | |
|---|---|---|---|
| Cpd of formula (I) | 2 | 70 | |
|  | 1 | 0 | |
| Spirotetramat | 60 | 0 | |
|  | 30 | 0 | |
|  |  | obs.* | cal.** |

TABLE D-continued

Meloidogyne incognita - test

| Active Ingredient | Concentration in ppm | Efficacy in % after 14 days | |
|---|---|---|---|
| Cpd of formula (I) + Spirotetramat (1:30) according to the invention | 2 + 60 | 100 | 70 |
|  | 1 + 30 | 70 | 0 |

*obs. = observed insecticidal efficacy,
**cal. = efficacy calculated with Colby-formula

The invention claimed is:

1. An active compound combination comprising at least one compound of formula (I)

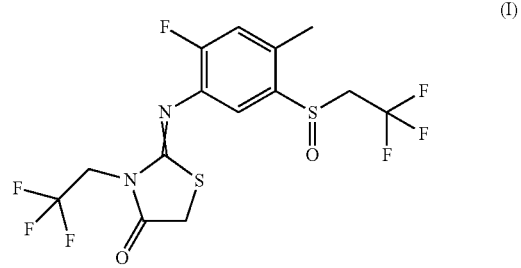 [SMILES: Cc1cc(F)c(N=C2SCC(=O)N2CC(F)(F)F)cc1S(=O)CC(F)(F)F]

(I)

and at least one active compound of group (II) which is selected from the group consisting of (II-1) abamectin, (II-2) emamectin benzoate, (II-4) milbemectin, (II-6) spiromesifen, (II-7) spirotetramat, (II-8) cyenopyrafen, (II-9) cyflumetofen, (II-10) spinosad and (II-14) pyflubumide, or is selected from the group consisting of a compound of formula (IIa)

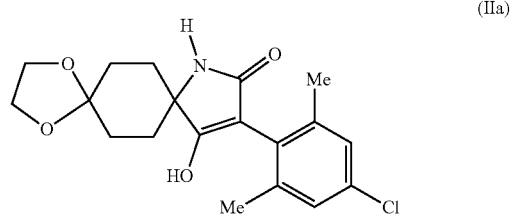 [SMILES: Cc1cc(Cl)cc(C)c1C1=C(O)C2(CCC3(CC2)OCCO3)NC1=O]

(IIa)

and a compound of formula (IIb)

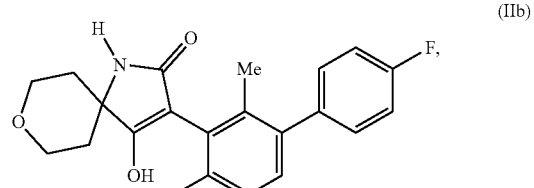

(IIb)

wherein the compound combination is synergistically active;

and wherein the mixing ratio of active compound of the formula (I) to (II-10) spinosad is 10:1 to 1:10 based on weight ratio;

the mixing ratios of active compound of the formula (I) to (II-1) abamectin, to (II-2) emamectin benzoate and to (II-4) milbemectin are 400:1 to 1:1, 50:1 to 1:1 and 5:1 to 1:5, respectively, each based on weight ratio;

the mixing ratios of active compound of the formula (I) to (II-6) spiromesifen and to (II-7) spirotetramat are 20:1 to 1:10 and 30:1 to 1:30, respectively, each based on weight ratio;

the mixing ratios of active compound of the formula (I) to (II-8) cyenopyrafen, to (II-9) cyflumetofen and to (II-14) pyflubumide are 10:1 to 1:10, 10:1 to 1:5 and 20:1 to 1:10, respectively, each based on weight ratio; and the mixing ratio of active compound of the formula (I) to compounds of formula (IIa) or (IIb) is 10:1 to 1:10, based on weight ratio.

2. The active compound combination according to claim 1, wherein the compound of formula (I) is present in form of a (+) enantiomer, or is present in form of a mixture of (+) enantiomer and (−) enantiomer which is enriched in the (+) enantiomer.

3. The active compound combination according to claim 2, wherein the compound of formula (I) is present in the form of a mixture of (+) enantiomer and (−) enantiomer which is enriched in the (+) enantiomer in a mixing ratio of at least 60:40 (+):(−) enantiomer.

4. A product comprising the active compound combination as defined in claim 1 for controlling one or more animal pests.

5. The product according to claim 4, wherein the animal pest is an insect, arachnid or acarid pest.

6. A product comprising the active compound combination as defined in claim 1 for controlling one or more microbial pests.

7. A product comprising the active compound combination as defined in claim 1 for controlling nematodes.

8. A product comprising the active compound combination as defined in claim 1 as a plant-strengthening agent.

9. A product comprising an active compound combination as defined in claim 1 for seed treatment.

10. A product comprising the active compound combination as defined in claim 1 on one or more transgenic plants.

11. A product comprising the active compound combination according to claim 1 for treating one or more plants or parts thereof selected from the group consisting of citrus, pome fruits, stone fruits, tropical fruits, nuts, berries, vegetables, cotton, soybean, grape, tea, coffee, maize, rice and ornamentals.

12. A method for controlling animal or microbial pests, comprising allowing the active compound combination as defined in claim 1 to act on animal or microbial pests and/or a habitat thereof.

13. The method according to claim 12, wherein the animal pest is an insect or arachnid or acarid pest.

14. A process for preparing a crop protection agent, comprising mixing the active compound combination as defined in claim 1 with one or more extenders and/or surfactants.

* * * * *